US009860797B2

(12) United States Patent
Basu Mallick et al.

(10) Patent No.: US 9,860,797 B2
(45) Date of Patent: Jan. 2, 2018

(54) EFFICIENT STATUS REPORTING FOR UES IN DUAL CONNECTIVITY DURING MOBILITY

(71) Applicant: Panasonic Intellectual Property Corporation of America, Torrance, CA (US)

(72) Inventors: Prateek Basu Mallick, Langen (DE); Joachim Loehr, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 30 days.

(21) Appl. No.: 14/910,991

(22) PCT Filed: Jul. 24, 2014

(86) PCT No.: PCT/EP2014/065949
§ 371 (c)(1),
(2) Date: Feb. 8, 2016

(87) PCT Pub. No.: WO2015/018653
PCT Pub. Date: Feb. 12, 2015

(65) Prior Publication Data
US 2016/0212661 A1 Jul. 21, 2016

(30) Foreign Application Priority Data

Aug. 9, 2013 (EP) ..................................... 13179909

(51) Int. Cl.
*H04W 36/00* (2009.01)
*H04L 1/16* (2006.01)
(Continued)

(52) U.S. Cl.
CPC ......... *H04W 36/0027* (2013.01); *H04L 1/165* (2013.01); *H04L 1/1614* (2013.01);
(Continued)

(58) Field of Classification Search
CPC ............. H04W 36/0027; H04W 36/32; H04W 36/0016; H04W 36/023; H04L 5/0023;
(Continued)

(56) References Cited

U.S. PATENT DOCUMENTS

2004/0052229 A1 3/2004 Terry et al.
2007/0008916 A1* 1/2007 Haugli ................. H04B 7/2041
370/320
(Continued)

FOREIGN PATENT DOCUMENTS

WO 2008/076073 A1 6/2008
WO 2009/022807 A1 2/2009
WO 2009035262 A1 3/2009

OTHER PUBLICATIONS

3GPP TS 36.211 V8.9.0, 3rd Generation Partnership Project; Technical Specification Group Radio Access Network; Evolved Universal Terrestrial Radio Access (E-UTRA); Physical Channels and Modulation (Release 8), Dec. 2009, 83 pages.
(Continued)

*Primary Examiner* — Christine Ng
(74) *Attorney, Agent, or Firm* — Seed IP Law Group LLP

(57) ABSTRACT

The invention relates to a method for efficiently performing a Se NB change for a UE in dual connectivity. When reconfiguring a data radio bearer going via the Se NB to another target base station, the UE may compile a PDCP status report comprising status information for all of the data radio bearer going via the Se NB, accompanied respectively by a radio bearer ID to identify the radio bearer to which the status report information pertains. Further, the PDCP status report is directly transmitted by the UE to the Me NB to avoid the backhaul delay between the Se NB and the Me NB; this may be done by using a signaling radio bearer (e.g. RRC message), or data radio bearer to the Me NB (e.g.

(Continued)

PDCP control PDU), or by using a physical channel transmission to the Me NB (e.g. MAC CE).

18 Claims, 19 Drawing Sheets

(51) Int. Cl.
| | |
|---|---|
| *H04L 5/00* | (2006.01) |
| *H04L 27/26* | (2006.01) |
| *H04W 36/32* | (2009.01) |
| *H04W 36/02* | (2009.01) |

(52) U.S. Cl.
CPC ............ *H04L 5/003* (2013.01); *H04L 5/0023* (2013.01); *H04L 27/2601* (2013.01); *H04W 36/0016* (2013.01); *H04W 36/32* (2013.01); *H04W 36/023* (2013.01)

(58) Field of Classification Search
CPC ... H04L 1/1614; H04L 27/2601; H04L 5/003; H04L 1/165
USPC .................................. 370/328, 338, 401, 465
See application file for complete search history.

(56) References Cited

U.S. PATENT DOCUMENTS

| | | | | |
|---|---|---|---|---|
| 2009/0318152 | A1* | 12/2009 | Maheshwari | H04L 1/1822 455/436 |
| 2011/0310937 | A1* | 12/2011 | Lin | H04L 5/001 375/219 |
| 2014/0204771 | A1* | 7/2014 | Gao | H04W 36/28 370/252 |
| 2014/0269632 | A1* | 9/2014 | Blankenship | H04W 76/025 370/336 |
| 2015/0195800 | A1* | 7/2015 | Zhu | H04W 72/12 370/311 |
| 2016/0021581 | A1* | 1/2016 | Deenoo | H04W 36/0055 370/331 |

OTHER PUBLICATIONS

3GPP TS 36.300 V11.6.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Jun. 2013, 209 pages.
3GPP TS 36.323 V11.2.0 3rd Generation Partnership Project; Technical Specification Group Radio Access Network; Evolved Universal Terrestrial Radio Access (E-UTRA); Packet Data Convergence Protocol (PDCP) specification (Release 11), Mar. 2013, 27 pages.
3GPP TS 36.331 V11.4.0, 3rd Generation Partnership Project; Technical Specification Group Radio Access Network; Evolved Universal Terrestrial Radio Access (E-UTRA); Radio Resource Control (RCC); Protocol specification (Release 11), Jun. 2013, 346 pages.
3GPP TR 36.842 V0.2.0, 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), May 2013, 38 pages.
3GPP TR 36.932 V12.1.0, 3rd Generation Partnership Project; Technical Specification Group Radio Access Network; Scenarios and requirements for small cell enhancements for E-UTRA and E-UTRAN (Release 12), Mar. 2013, 14 pages.
Ericsson, ST-Ericsson, "Limitation of PDCP SN and FMS-fields," Tdoc R2-122651, 3GPP TSG-RAN WG2 #78, Agenda Item: 07.01.2.3, Prague, Czech Republic, May 21-25, 2012, 6 pages.
Huawei, HiSilicon, "Analysis of inter-node signalling load for mobility mechanism in small cell deployment," R2-130228, 3GPP TSG-RAN WG2 Meeting #81, Agenda Item: 7.2, St. Julian's, Malta, Jan. 28-Feb. 1, 2013, 5 pages.
Huawei, HiSilicon, "Impact analysis of bearer split options for multi-site aggregation," R2-131784, 3GPP TSG-RAN WG2 Meeting #82, Agenda Item: 7.2.2.1, Fukuoka, Japan, May 20-24, 2013, 4 pages.
LG Electronics Inc., "UP Radio Protocol for Dual Connectivity," R2-131231, 3GPP TSG-RAN2 Meeting #81bis, Agenda Item: 7.2., Chicago, USA, Apr. 15-19, 2013, 7 pages.
Nokia Siemens Networks (Rapporteur),"Email Discussion Report on U-Plane Alternatives [81bis#19]," R2-131621, 3GPP TSG-RAN WG2 Meeting #82, Agenda Item: 7.2.2.1, Fukuoka, Japan, May 20-24, 2013, 40 pages.
Pantech, "Consideration on UP Alternatives 2C and 3C," R2-131797, 3GPP TSG RAN WG2 Meeting #82, Agenda Item: 7.2, Fukuoka, Japan, May 20-24, 2013, 6 pages.
Sesia et al., "LTE the UMTS Long Term Evolution—From Theory to Practice," Wiley, 2009, chs. 4.2.2-4.2.4, 4.3.1, 9 pages.
International Search Report dated Oct. 28, 2014, for corresponding International Application No. PCT/EP2014/065949, 4 pages.
European Communication pursuant to Article 94(3) EPC dated Apr. 12, 2015, for corresponding EP Application No. 13 179 909.0-1860, 8 pages.
Extended European Search Report dated Dec. 5, 2013, for corresponding EP Application No. 13179909.0-1860, 12 pages.
Sesia et al., "LTE the UMTS Long Term Evolution—From Theory to Practice," Wiley, 2011, Figure 2.8, 4 pages.

* cited by examiner

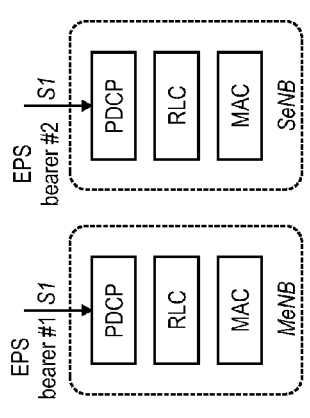
Fig. 22a Alternative 1A
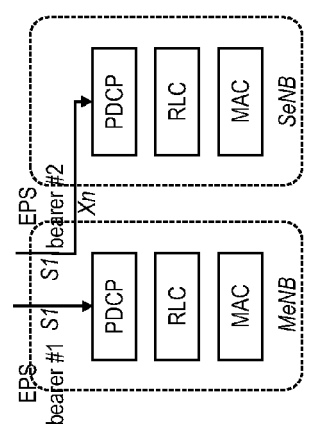
Fig. 22b Alternative 2A
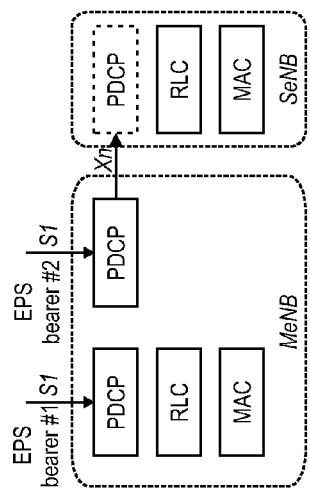
Fig. 22c Alternative 2B
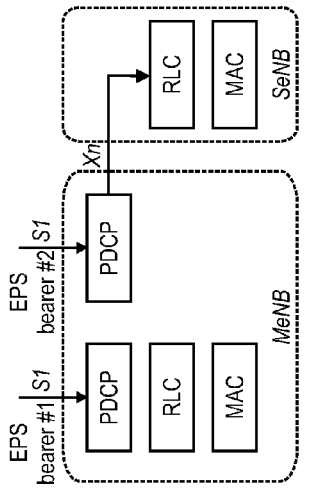
Fig. 22d Alternative 2C
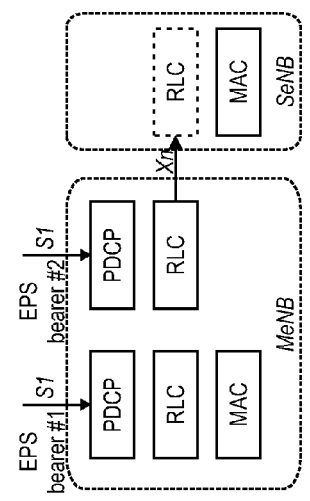
Fig. 22e Alternative 2D
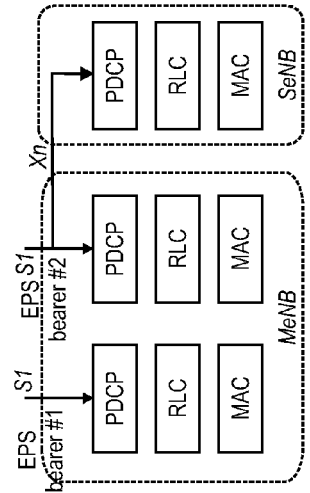
Fig. 22f Alternative 3A
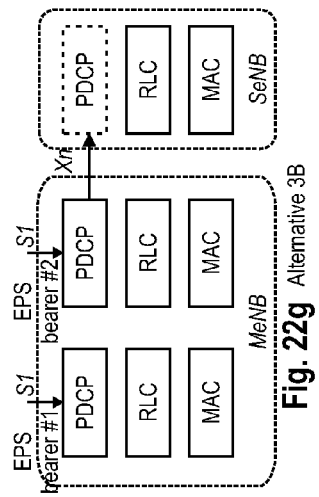
Fig. 22g Alternative 3B
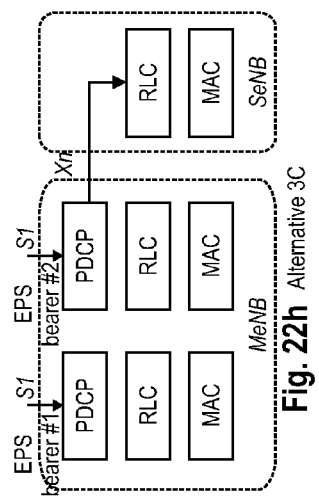
Fig. 22h Alternative 3C
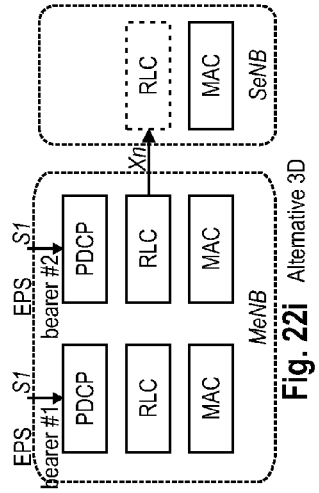
Fig. 22i Alternative 3D

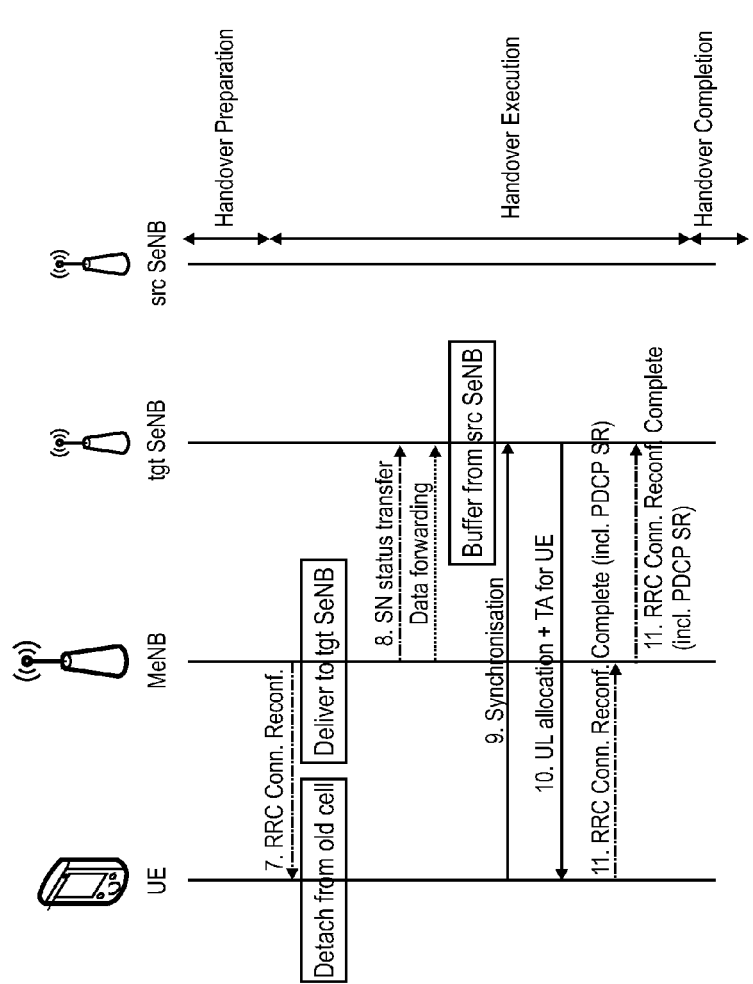

EFFICIENT STATUS REPORTING FOR UES IN DUAL CONNECTIVITY DURING MOBILITY

FIELD OF THE INVENTION

The invention relates to methods for transmitting a status report by a mobile station. The invention is also providing a mobile station and base station for participating and for performing the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMES/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g. 7 OFDM symbols)

and $N_{sc}^{RB}$ consecutive subcarriers in the frequency domain as exemplified in FIG. 4 (e.g. 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). The characteristics of the downlink and uplink PCell are:

- For each SCell the usage of uplink resources by the UE, in addition to the downlink ones is configurable; the number of DL SCCs configured is therefore always larger or equal to the number of UL SCCs, and no SCell can be configured for usage of uplink resources only
- The uplink PCell is used for transmission of Layer 1 uplink control information
- The downlink PCell cannot be de-activated, unlike SCells
- From UE perspective, each uplink resource only belongs to one serving cell
- The number of serving cells that can be configured depends on the aggregation capability of the UE
- Re-establishment is triggered when the downlink PCell experiences Rayleigh fading (RLF), not when downlink SCells experience RLF
- The downlink PCell cell can change with handover (i.e. with security key change and RACH procedure)
- Non-access stratum information is taken from the downlink PCell
- PCell can only be changed with handover procedure (i.e. with security key change and RACH procedure)
- PCell is used for transmission of PUCCH The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

General Overview of the OSI Layer

FIG. 7 provides a brief overview of the OSI model on which the further discussion of the LTE architecture is based and based on which also the invention will be discussed herein.

The Open Systems Interconnection Reference Model (OSI Model or OSI Reference Model) is a layered abstract description for communication and computer network protocol design. The OSI model divides the functions of a system into a series of layers. Each layer has the property that it only uses the functions of the layer below, and only exports functionality to the layer above. A system that implements protocol behavior consisting of a series of these layers is known as a 'protocol stack' or 'stack'. Its main feature is in the junction between layers which dictates the specifications on how one layer interacts with another. This means that a layer written by one manufacturer can operate with a layer from another. For the purposes of the invention, only the first three layers will be described in more detail below.

The physical layer or layer 1's main purpose is the transfer of information (bits) over a specific physical medium (e.g. coaxial cables, twisted pairs, optical fibers, air interface, etc.). It converts or modulates data into signals (or symbols) that are transmitted over a communication channel.

The purpose of the data link layer (or Layer 2) is to shape the information flow in a way compatible with the specific physical layer by breaking up the input data into data frames (Segmentation And Re-assembly (SAR) functions). Furthermore, it may detect and correct potential transmission errors by requesting a retransmission of a lost frame. It typically provides an addressing mechanism and may offer flow control algorithms in order to align the data rate with the receiver capacity. If a shared medium is concurrently used by multiple transmitters and receivers, the data link layer typically offers mechanisms to regulate and control access to the physical medium.

As there are numerous functions offered by the data link layer, the data link layer is often subdivided into sublayers (e.g. RLC and MAC sublayers in UMTS). Typical examples of Layer 2 protocols are PPP/HDLC, ATM, frame relay for fixed line networks and RLC, LLC or MAC for wireless systems. More detailed information on the sublayers PDCP, RLC and MAC of layer 2 is given later.

The network layer or Layer 3 provides the functional and procedural means for transferring variable length packets from a source to a destination via one or more networks while maintaining the quality of service requested by the transport layer. Typically, the network layer's main purposes are inter alia to perform network routing, network fragmentation and congestion control functions. The main examples of network layer protocols are the IP Internet Protocol or X.25.

With respect to Layers 4 to 7 it should be noted that depending on the application and service it is sometimes difficult to attribute an application or service to a specific layer of the OSI model since applications and services operating above Layer 3 often implement a variety of functions that are to be attributed to different layers of the OSI model. Therefore, especially in TCP(UDP)/IP based networks, Layer 4 and above is sometimes combined and forms a so-called "application layer".

Layer Services and Data Exchange

In the following the terms service data unit (SDU) and protocol data unit (PDU) as used herein are defined in connection with FIG. 8. In order to formally describe in a generic way the exchange of packets between layers in the OSI model, SDU and PDU entities have been introduced. An SDU is a unit of information (data/information block) transmitted from a protocol at the layer N+1 that requests a service from a protocol located at layer N via a so-called service access point (SAP). A PDU is a unit of information exchanged between peer processes at the transmitter and at the receiver of the same protocol located at the same layer N.

A PDU is generally formed by a payload part consisting of the processed version of the received SDU(s) preceded by a layer N specific header and optionally terminated by a trailer. Since there is no direct physical connection (except for Layer 1) between these peer processes, a PDU is forwarded to the layer N−1 for processing. Therefore, a layer N PDU is from a layer N−1 point of view an SDU.

LTE Layer 2—User Plane and Control Plane Protocol Stack

The LTE layer 2 user-plane/control-plane protocol stack comprises three sublayers as shown in FIG. 9, PDCP, RLC and MAC. As explained before, at the transmitting side, each layer receives a SDU from a higher layer for which the layer provides a service and outputs a PDU to the layer below. The RLC layer receives packets from the PDCP layer. These packets are called PDCP PDUs from a PDCP point of view and represent RLC SDUs from an RLC point of view. The RLC layer creates packets which are provided to the layer below, i.e. the MAC layer. The packets provided by RLC to the MAC layer are RLC PDUs from an RLC point of view and MAC SDUs from a MAC point of view.

At the receiving side, the process is reversed, with each layer passing SDUs up to the layer above, where they are received as PDUs.

While the physical layer essentially provides a bitpipe, protected by turbo-coding and a cyclic redundancy check (CRC), the link-layer protocols enhance the service to upper layers by increased reliability, security and integrity. In addition, the link layer is responsible for the multi-user medium access and scheduling. One of the main challenges for the LTE link-layer design is to provide the required reliability levels and delays for Internet Protocol (IP) data flows with their wide range of different services and data rates. In particular, the protocol over-head must scale. For example, it is widely assumed that voice over IP (VoIP) flows can tolerate delays on the order of 100 ms and packet losses of up to 1 percent. On the other hand, it is well-known that TCP file downloads perform better over links with low bandwidth-delay products. Consequently, downloads at very high data rates (e.g., 100 Mb/s) require even lower delays and, in addition, are more sensitive to IP packet losses than VoIP traffic.

Overall, this is achieved by the three sublayers of the LTE link layer that are partly intertwined.

The Packet Data Convergence Protocol (PDCP) sublayer is responsible mainly for IP header compression and ciphering. In addition, it supports lossless mobility in case of inter-eNB handovers and provides integrity protection to higher layer-control protocols.

The radio link control (RLC) sublayer comprises mainly ARQ functionality and supports data segmentation and concatenation. The latter two minimize the protocol over-head independent of the data rate.

Finally, the medium access control (MAC) sublayer provides HARQ and is responsible for the functionality that is required for medium access, such as scheduling operation and random access. FIG. 10 exemplary depicts the data flow of an IP packet through the link-layer protocols down to the physical layer. The figure shows that each protocol sublayer adds its own protocol header to the data units.

Packet Data Convergence Protocol (PDCP)

The PDCP layer processes Radio Resource Control (RRC) messages in the control plane and IP packets in the user plane. Depending on the radio bearer characteristics and the mode of the associated RLC entity (AM, UM, TM), the main functions performed by a PDCP entity of the PDCP layer are:

header compression and decompression (e.g. using Robust Header Compression (ROHC) for user plane data (DRB)

Security functions:
Ciphering and deciphering for user plane and control plane data (for SRB and DRB)
Integrity protection and verification for control plane data (for SRB)

Maintenance of PDCP sequence numbers for SRB and DRB

Handover support functions:
In-sequence delivery and reordering of PDUs for the layer above at handover for AM DRB;
Lossless handover for user plane data mapped on RLC Acknowledged Mode (AM); including Status Reporting for AM DRBs and duplicate elimination of lower layers SDUs for AM DRB Discard for user plane data due to timeout (for SRB and DRB).

The PDCP layer manages data streams in the user plane, as well as in the control plane, only for the radio bearers using either a Dedicated Control Channel (DCCH) or a Dedicated Transport Channel (DTCH). The architecture of the PDCP layer differs for user plane data and control plane data. Two different types of PDCP PDUs are defined in LTE: PDCP Data PDUs and PDCP Control PDUs. PDCP Data PDUs are used for both control and user plane data. PDCP Control PDUs are only used to transport the feedback information for header compression, and for PDCP status reports which are used in case of handover and hence are only used within the user plane.

Due to the low relevance to the invention, the functions of Header Compression and Security are not explained in detail; details in said respect can be found in LTE—The UMTS Long Term Evolution FROM THEORY TO PRACTICE, Edited by: Stefania Sesia, Issam Toufik, Matther Baker, Second Edition, ISBN 978-0-470-66025-6, Chapters 4.2.2, 4.2.3 and 4.2.4 incorporated herein by reference.

On the other hand, the handover functionality will be explained in the following in detail. Handover is performed when the UE moves from the coverage of one cell to the coverage of another cell in RCC_CONNECTED state. Depending on the required QoS, either a seamless or a lossless handover is performed as appropriate for each user plane radio bearer, as explained in the following.

Seamless handover is applied for user plane radio bearers mapped on RLC Unacknowledged Mode (UM). These types of data are typically reasonably tolerant of losses but less tolerant of delay (e.g. voice services).

Based on the sequence number that is added to PDCP data PDUs, it is possible to ensure in-sequence delivery during handover, and even provide a fully lossless handover functionality by performing retransmission of PDCP SDUs for which reception has not yet been acknowledged prior to handover. This lossless handover function is used for delay-tolerant services such as file downloads where the loss of one PDCP SDU can result in a drastic reduction in the data rate due to the reaction of the Transmission Control Protocol (TCP).

Lossless handover is applied for user plane radio bearers (i.e. data radio bearers) that are mapped on RLC Acknowledged Mode (AM). For simplicity reasons, inter-eNodeB handover and intra-eNodeB handover are handled in the same way in LTE.

In normal transmission, while the UE is not handing over from one cell to another, the RLC layer in the UE and the eNodeB ensures in-sequence delivery. PDCP PDUs that are retransmitted by the RLC protocol, or that arrive out of sequence due to the variable delay in the HARQ transmission, are reordered based on the RLC SN. At handover, the RLC layer in the UE and in the eNodeB will deliver all PDCP PDUs that have already been received to the PDCP layer in order to have them decompressed before the header compression protocol is reset. Because some PDCP SDUs may not be available at this point, the PDCP SDUs that are not available in-sequence are not delivered immediately to higher layers in the UE or to the gateway in the network. In the PDCP layer, the PDCP SDUs received out of order are stored in the reordering buffer. PDCP SDUs that have been transmitted but not yet been acknowledged by the RLC layer are stored in a retransmission buffer in the PDCP layer.

In order to ensure lossless handover in the uplink, the UE retransmits the PDCP SDUs stored in the PDCP retransmission buffer. For example, after the handover, the UE restarts the transmission of those PDCP SDUs for which successful transmission has not yet been acknowledged to the target eNodeB. In order to ensure in-sequence delivery in the uplink, the source eNodeB, after decompression, delivers the PDCP SDUs that are received in-sequence to the gateway, and forwards the PDCP SDUs that are received out-of-sequence to the target eNodeB. Thus, the target eNodeB can reorder the decompressed PDCP SDUs received from the source eNodeB and the retransmitted PDCP SDUs received from the UE based on the PDCP SNs which are maintained during the handover, and deliver them to the gateway in the correct sequence.

In order to ensure lossless handover in the downlink, the source eNodeB forwards the uncompressed PDCP SDUs for which reception has not yet been acknowledged by the UE to the target eNodeB for retransmission in the downlink. The source eNodeB receives an indication from the gateway that indicates the last packet sent to the source eNodeB. The source eNodeB also forwards this indication to the target eNodeB so that the target eNodeB knows when it can start transmission of packets received from the gateway.

The UE will expect the packets from the target eNodeB in ascending order of SNs. In the case of a packet not being forwarded from the source eNodeB to the target eNodeB (i.e. when one of the packets that the UE expects is missing during the handover operation), the UE can immediately conclude that the packet is lost and can forward the packets which have already been received in sequence to higher layers. This avoids the UE having to retain already-received packets in order to wait for a potential retransmission. Thus, the forwarding of the packets in the network can be decided without informing the UE.

In some cases it may happen that a PDCP SDU has been successfully received, but a corresponding RLC acknowledgement has not. In this case, after the handover, there may be unnecessary retransmissions initiated by the UE or the target eNodeB based on the incorrect status received by the RLC layer. In order to avoid these unnecessary retransmissions, a PDCP status report can be sent from the eNodeB to the UE and from the UE to the eNodeB. Additionally, a PDCP status report can request retransmission of PDCP SDUs which were correctly received but failed in header decompression. Whether to send a PDPC status report after a handover is configured independent for each radio bearer.

PDCP PDU Formats

There are two types of PDUs in PDCP: PDCP data PDUs and PDCP control PDUs. A PDCP data PDU is used to transport user plane data such as an IP packet or control plane data such as a RRC/NAS message. PDCP PDUs for user plane data comprise a "D/C" field in order to distinguish Data and Control PDUs, the formats of which are shown in FIGS. 11 and 12 respectively. PDCP Data PDUs comprise a 7- or 12-bit sequence number (SN). PDCP Data PDUs for user plane data contain either an uncompressed (if header compression is not used) or a compressed IP packet. PDCP Data PDUs for control plane data (e.g. RRC signalling) comprise a MAC-I field of 32-bit length for integrity protection. PDCP Data PDUs for control plane data contain one complete RRC message.

PDCP control PDUs are used by PDCP entities handling user plane data. There are two types of PDCP Control PDUs defined at the moment, distinguished by the PDU Type field in the PDCP header. PDCP Control PDUs carry either PDCP "Status Reports" for the case of lossless handover, or ROHC feedback created by the ROHC header compression protocol. PDCP Control PDUs carrying ROHC feedback are used for user plane radio bearers mapped on either RLC UM or RLC AM, while PDCP control PDUs carrying PDCP Status Reports are used only for user plane radio bearers mapped on RLC AM.

PDCP Status Report

A PDCP control PDU carrying a PDCP Status Report (PDCP SR) for the case of lossless handover is used to prevent the retransmission of already-correctly-received PDCP SDUs, and also may be used to request retransmission of PDCP SDUs which were correctly received but for which header decompression failed. This PDCP control PDU with the status report contains a bitmap indicating which PDCP SDUs need to be retransmitted and a reference SN, the First Missing SDU (FMS). In the case that all PDCP SDUs have been received in sequence, this field indicates the next expected SN, and no bitmap is included.

FIG. 13 shows the format of a PDCP control PDU carrying the PDCP status report when a 12-bit SN length is used, and FIG. 14 shows the format of a PDCP control PDU carrying the PDCP status report when a 15-bit SN length is used; as defined by 3GPP TS 36.323 v11.2.0 in chapter 6.2.6. This format is applicable for DRBs mapped on RLC AM.

As apparent from FIGS. 13 and 14, the PDCP control PDU for the PDCP status report comprises the following parameters as defined by 3GPP TS 36.323 v11.2.0 chapters 6.3.7-6.3.10 (incorporated herein by reference):

- a one bit "D/C" field, allowing to distinguish between a control and data PDCP PDU
- a 3-bit PDU type field, allowing to distinguish between a PDCP status report and an interspersed ROHC feedback packet; bits 010-111 are reserved
- an FMS field, with a length of 12 bits when a 12-bit SN is used, and with a length of 15 bits when a 15-bit SN is used; it indicates PDCP SN of the first missing PDCP SDU
- a bitmap field of variable length; the length can be 0; the MSB of the first octet of the type "Bitmap" indicates whether or not the PDCP SDU with the SN (FMS+1) modulo (Maximum_PDCP_SN+1) has been received and, optionally decompressed correctly. The LSB of the first octet of the type "Bitmap" indicates whether or not the PDCP SDU with the SN (FMS+8) modulo (Maximum_PDCP_SN+1) has been received and, optionally decompressed correctly. The UE fills the bitmap indicating which SDUs are missing (unset bit—'0'), i.e. whether an SDU has not been received or optionally has been received but has not been decompressed correctly, and which SDUs do not need retransmission (set bit—'1'), i.e. whether an SDU has been received correctly and may or may not have been decompressed correctly.

The PDCP status report is explained in more detail in 3GPP TS 36.323 v11.2.0 Chapter 5.3.5.3.1, incorporated by reference herein.

For the transmit operation, when upper layers request a PDCP re-establishment, for radio bearers that are mapped on RLC AM, the UE shall:

if the radio bearer is configured by upper layers to send a PDCP status report in the uplink, compile a status report as indicated below after processing the PDCP Data PDUs that are received from lower layers due to the re-establishment of the lower layers, and submit it to lower layers as the first PDCP PDU for the transmission, by:

setting the FMS field to the PDCP SN of the first missing PDCP SDU;

if there is at least one out-of-sequence PDCP SDU stored, allocating a Bitmap field of length in bits equal to the number of PDCP SNs from and not including the first missing PDCP SDU up to and including the last out-of-sequence PDCP SDUs, rounded up to the next multiple of 8;

setting as '0' in the corresponding position in the bitmap field for all PDCP SDUs that have not been received as indicated by lower layers, and optionally PDCP SDUs for which decompression have failed;

indicating in the bitmap field as '1' for all other PDCP SDUs.

For the receive operation, when a PDCP status report is received in the downlink, for radio bearers that are mapped on RLC AM:

for each PDCP SDU, if any, with the bit in the bitmap set to '1', or with the associated COUNT value less than the COUNT value of the PDCP SDU identified by the FMS field, the successful delivery of the corresponding PDCP SDU is confirmed, and the UE shall process the PDCP SDU.

In other words, a PDCP status report is compiled and transmitted every time the PDCP layer is re-established.

A PDCP re-establishment for all radio bearers that are established is performed e.g. during a handover, i.e. when receiving by the UE an RRCConnectionReconfiguration including the mobilityControlInfo, as defined in 3GPP TS 36.331 v11.4.0 chapter 5.3.5.4, incorporated herein by reference. A PDCP re-establishment for SRB2 and all DRBs that are established is performed when the UE receives a RRCConnectionReconfiguration not including the mobilityControlInfo if this is the first RRCConnectionReconfiguration message after successful completion of the RRC Connection Re-establishment procedure, as defined in 3GPP TS 36.331 v11.4.0 chapter 5.3.5.3, incorporated herein by reference. Furthermore, a PDCP re-establishment is also performed, although only for SRB1, when the UE receives a RRCConnectionReestablishment, as defined in 3GPP TS 36.331 v11.4.0 chapter 5.3.7.5, incorporated herein by reference.

RRC

The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, Measurement configuration and reporting, Radio resource configuration, initial security activation, establishment of Signalling Radio Bearer (SRBs) and of radio bearers carrying user data (Data Radio Bearers, DRBs).

Dedicated RRC messages are transferred across Signalling Radio Bearers, which are mapped via the PDCP and RLC layers onto logical channels—either the Common Control Channel (CCCH) during connection establishment or a Dedicated Control Channel (DCCH) in RRC_CONNECTED. System information and paging messages are mapped directly to logical channels, the Broadcast Control Channel (BCCH) and Paging Control Channel (PCCH) respectively.

The main difference between SRB1 and SRB2 is the priority handling in the eNB, i.e. RRC messages sent over SRB2 have lower priority than the RRC messages sent over SRB1.

SRB0 is used for RRC messages which use the CCCH; SRB1 is for RRC messages using the DCCH; SRB2 is for the (lower-priority) RRC messages using the DCCH which only include NAS dedicated information. Prior to SRB2 establishment, SRB1 is also used for RRC messages which only include NAS dedicated information or MDT (measurement drive test) logged measurement results. In addition, SRB1 is used for higher-priority RRC messages which only include NAS dedicated information.

All RRC messages using DCCH are integrity-protected and ciphered by the PDCP layer (after security activation). The RRC messages using CCCH are not integrity-protected.

Radio Link Control (RLC)

The RLC layer is located between the PDCP layer (the "upper" layer, from RLC perspective) and the MAC layer (the "lower" layer, from RLC perspective). It communicates with the PDCP layer through a Service Access Point (SAP) and with the MAC layer via logical channels. The RLC layer reformats PDCP PDUs (i.e. RLC SDUs) in order to fit them into the size indicated by the MAC layer; i.e., the RLC transmitter segments and/or concatenates the PDCP PDUs, and the RLC receiver reassembles the RLC PDUs to reconstruct the PDCP PDUs. In addition, the RLC reorders the RLC PDUs if they are received out of sequence due to the HARQ operation performed in the MAC layer.

The functions of the RLC layer are performed by "RLC entities". An RLC entity is configured in one of three data transmission modes: Transparent Mode (TM), Unacknowledged Mode (UM) and Acknowledged Mode (AM). In AM, special functions are defined to support retransmission.

The main functions of UM RLC can be summarized as follows: Segmentation and concatenation of RLC SDUs (i.e. PDCP PDUs); reordering of RLC PDUs; Duplicate detection of RLC SDUs; Reassembly of RLC SDUs.

The main functions of AM RLC can be summarized as follows: Retransmission of RLC Data PDUs; Re-Segmentation of retransmitted RLC Data PDUs; Polling; Status Reporting; Status Prohibit.

More information on RLC is given by chapter 4.3.1 of LTE—The UMTS Long Term Evolution FROM THEORY TO PRACTICE, Edited by: Stefania Sesia, Issam Toufik, Matther Baker, Second Edition, ISBN 978-0-470-66025-6, incorporated herein by reference.

Handover Procedure

As explained above, a PDCP status report is compiled and transmitted every time a handover is performed by the UE when UE is configured for PDCP status reporting.

A 3GPP LTE handover procedure is specified in 3GPP TS 36.300: "Evolved Universal Terrestrial Radio Access (E-UTRA) and Evolved Universal Terrestrial Radio Access Network (E-UTRAN); Overall description; Stage 2", version 11.6.0, section 10.1.2 available at http//www.3gpp.org and incorporated herein by reference. Further, details of the handover procedure relating to RRC connection reconfiguration are defined in TS 36.331: "Evolved Universal Terrestrial Radio Access (E-UTRA); Radio Resource Control (RRC); Protocol specification)", version 11.4.0 section 5.3.5 available at http//www.3gpp.org and incorporated herein by reference.

The intra-E-UTRAN-Access Mobility Support for UEs in CONNECTED Mode handles all necessary steps for handover procedures, like processes that precede the final handover, HO, decision on the source network side (control and evaluation of UE and eNB measurements taking into account certain UE specific area restrictions), preparation of resources on the target network side, commanding the UE to the new radio resources and finally releasing resources on the (old) source network side.

The intra E-UTRAN handover, HO, of a UE in RRC_CONNECTED state is a UE-assisted network-controlled HO, with HO preparation signalling in E-UTRAN:

Part of the HO command comes from the target eNB and is transparently forwarded to the UE by the source eNB;

To prepare the HO, the source eNB passes all necessary information to the target eNB.

Both the source eNB and UE keep some context (e.g. C-RNTI) to enable the return of the UE in case of HO failure;

UE accesses the target cell via RACH following a contention-free procedure using a dedicated RACH preamble or following a contention-based procedure if dedicated RACH preambles are not available:

the UE uses the dedicated preamble until the handover procedure is finished (successfully or unsuccessfully);

If the RACH procedure towards the target cell is not successful within a certain time, the UE initiates radio link failure recovery using the best cell;

The preparation and execution phase of the HO procedure is performed without EPC involvement, i.e. preparation messages are directly exchanged between the eNBs. The release of the resources at the source side during the HO completion phase is triggered by the eNB.

Below a more detailed description of the intra-MME/Serving Gateway handover, HO, procedure illustrated in FIG. 15 is given where preceeding numbers refer to corresponding steps in the sequence diagram of FIG. 15:

0 The UE context within the source eNB contains information regarding roaming restrictions which were provided either at connection establishment or at the last TA update.

1 The source eNB configures the UE measurement procedures according to the area restriction information. Measurements provided by the source eNB may assist the function controlling the UE's connection mobility.

2 A MEASUREMENT REPORT is triggered and sent to the eNB.

3 The source eNB makes decision based on MEASUREMENT REPORT and RRM information to hand off the UE.

4 The source eNB issues a HANDOVER REQUEST message to the target eNB passing necessary information to prepare the HO at the target side (UE X2 signalling context reference at source eNB, UE S1 EPC signalling context reference, target cell ID, KeNB*, RRC context including the C-RNTI of the UE in the source eNB, AS-configuration, E-RAB context and physical layer ID of the source cell+short MAC-I for possible RLF recovery). UE X2/UE S1 signalling references enable the target eNB to address the source eNB and the EPC. The E-RAB context includes necessary RNL and TNL addressing information, and QoS profiles of the E-RABs.

5 Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6 The target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

NOTE: As soon as the source eNB receives the HANDOVER REQUEST ACKNOWLEDGE, or as soon as the transmission of the handover command is initiated in the downlink, data forwarding may be initiated.

Steps 7 to 16 provide means to avoid data loss during HO and are further detailed in 10.1.2.1.2 and 10.1.2.3 of 3GPP TS 36.300: "Evolved Universal Terrestrial Radio Access (E-UTRA) and Evolved Universal Terrestrial Radio Access Network (E-UTRAN); Overall description; Stage 2", version 11.6.0, available at http//www.3gpp.org and incorporated herein by reference.

7 The target eNB generates the RRC message to perform the handover, i.e RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

8 The source eNB sends the SN STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9 After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

10 The target eNB responds with UL allocation and timing advance.

11 When the UE has successfully accessed the target cell, the UE sends the RRCConnectionReconfiguration-Complete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfigurationComplete message. The target eNB can now begin sending data to the UE.

12 The target eNB sends a PATH SWITCH REQUEST message to MME to inform that the UE has changed cell.

13 The MME sends a MODIFY BEARER REQUEST message to the Serving Gateway.

14 The Serving Gateway switches the downlink data path to the target side. The Serving gateway sends one or more "end marker" packets on the old path to the source eNB and then can release any U-plane/TNL resources towards the source eNB.

15 The Serving Gateway sends a MODIFY BEARER RESPONSE message to MME.

16 The MME confirms the PATH SWITCH REQUEST message with the PATH SWITCH REQUEST ACKNOWLEDGE message.

17 By sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

18 Upon reception of the UE CONTEXT RELEASE message, the source eNB can release radio and C-plane related resources associated to the UE context. Any ongoing data forwarding may continue.

When an X2 handover is used involving HeNBs and when the source HeNB is connected to a HeNB GW, a UE CONTEXT RELEASE REQUEST message including an explicit GW Context Release Indication is sent by the source HeNB, in order to indicate that the HeNB GW may release of all the resources related to the UE context.

Small Cells

Explosive demands for mobile data are driving changes in how mobile operators will need to respond to the challenging requirements of higher capacity and improved Quality of user Experience (QoE). Currently, fourth generation wireless access systems using Long Term Evolution (LTE) are being deployed by many operators worldwide in order to offer faster access with lower latency and more efficiency than 3G/3.5G system. Nevertheless, the anticipated future traffic growth is so tremendous that there is a vastly increased need for further network densification to handle the capacity requirements, particularly in high traffic areas (hot spot areas) that generate the highest volume of traffic. Network densification—increasing the number of network nodes, thereby bringing them physically closer to the user terminals—is a key to improving traffic capacity and extending the achievable user-data rates of a wireless communication system.

In addition to straightforward densification of a macro deployment, network densification can be achieved by the deployment of complementary low-power nodes respectively small cells under the coverage of an existing macro-node layer. In such a heterogeneous deployment, the low-power nodes provide very high traffic capacity and very high user throughput locally, for example in indoor and outdoor hotspot positions. Meanwhile, the macro layer ensures service availability and QoE over the entire coverage area. In other words, the layer containing the low-power nodes can also be referred to as providing local-area access, in contrast to the wide-area-covering macro layer.

The installation of low-power nodes respectively small cells as well as heterogeneous deployments has been possible since the first release of LTE. In this regard, a number of solutions have been specified in recent releases of LTE (i.e., Release-10/11). More specifically, these releases introduced additional tools to handle inter-layer interference in heterogeneous deployments. In order to further optimize performance and provide cost/energy-efficient operation, small cells require further enhancements and in many cases need to interact with or complement existing macro cells. Such solutions will be investigated during the further evolution of LTE—Release 12 and beyond. In particular further enhancements related to low-power nodes and heterogeneous deployments will be considered under the umbrella of the new Rel-12 study item (SI) "Study on Small Cell Enhancements for E-UTRA and E-UTRAN". Some of these activities will focus on achieving an even higher degree of interworking between the macro and low-power layers, including different forms of macro assistance to the low-power layer and dual-layer connectivity. Dual connectivity implies that the device has simultaneous connections to both macro and low-power layers.

Some deployment scenarios assumed in this study item on small cell enhancements will be discussed below. In the following scenarios, the backhaul technologies categorized as non-ideal backhaul in TR 36.932 are assumed.

Both ideal backhaul (i.e., very high throughput and very low latency backhaul such as dedicated point-to-point connection using optical fiber) and non-ideal backhaul (i.e., typical backhaul widely used in the market such as xDSL, microwave, and other backhauls like relaying) should be studied. The performance-cost trade-off should be taken into account.

A categorization of non-ideal backhaul based on operator inputs is listed in the table below:

| Backhaul Technology | Latency (One way) | Throughput | Priority (1 is the highest) |
|---|---|---|---|
| Fiber Access 1 | 10-30 ms | 10M-10 Gbps | 1 |
| Fiber Access 2 | 5-10 ms | 100-1000 Mbps | 2 |
| Fiber Access 3 | 2-5 ms | 50M-10 Gbps | 1 |
| DSL Access | 15-60 ms | 10-100 Mbps | 1 |

| Backhaul Technology | Latency (One way) | Throughput | Priority (1 is the highest) |
|---|---|---|---|
| Cable | 25-35 ms | 10-100 Mbps | 2 |
| Wireless Backhaul | 5-35 ms | 10 Mbps-100 Mbps typical, maybe up to Gbps range | 1 |

Fiber access which can be used to deploy Remote Radio Heads (RRHs) is not assumed in this study. HeNBs are not precluded, but not distinguished from Pico eNBs in terms of deployment scenarios and challenges even though the transmission power of HeNBs is lower than that of Pico eNBs. The following 3 scenarios are considered.

Scenario #1 is illustrated in FIG. 16 and is the deployment scenario where macro and small cells on the same carrier frequency (intra-frequency) are connected via a non-ideal backhaul. User are distributed both for outdoor and indoor.

Scenario #2 is illustrated in FIGS. 17 and 18 and refers to a deployment scenario where macro and small cells on different carrier frequencies (inter-frequency) are connected via a non-ideal backhaul. User are distributed both for outdoor and indoor. There are essentially two different scenarios #2, referred herein as 2a and 2b, the difference being that in scenario 2b an indoor small cell deployment is considered.

Scenario #3 is illustrated in FIG. 19 and refers to a deployment scenario where only small cells on one or more carrier frequencies are connected via a non-ideal backhaul link.

Depending on the deployment scenario, different challenges/problems exist which need to be further investigated. During the study item phase such challenges have been identified for the corresponding deployment scenarios and captured in TS 36.842; more details on those challenges/problems can be found there.

In order to resolve the identified challenges which are described in section 5 of TS36.842, the following design goals are taken into account for this study in addition to the requirements specified in TR 36.932.

In terms of mobility robustness:
For UEs in RRC_CONNECTED, Mobility performance achieved by small cell deployments should be comparable with that of a macro-only network.

In terms of increased signaling load due to frequent handover:
Any new solutions should not result in excessive increase of signaling load towards the Core Network. However, additional signaling and user plane traffic load caused by small cell enhancements should also be taken into account.

In terms of improving per-user throughput and system capacity:
Utilising radio resources across macro and small cells in order to achieve per-user throughput and system capacity similar to ideal backhaul deployments while taking into account QoS requirements should be targeted.

Dual Connectivity

One promising solution to the problems which are currently under discussion in 3GPP RAN working groups is the so-called "dual connectivity" concept. The term "dual connectivity" is used to refer to an operation where a given UE consumes radio resources provided by at least two different network nodes connected via a non-ideal backhaul. Essentially, the UE is connected with both a macro cell (macro eNB) and small cell (secondary or small eNB). Furthermore, each eNB involved in dual connectivity for a UE may assume different roles. Those roles do not necessarily depend on the eNB's power class and can vary among UEs.

Since the study item is currently at a very early stage, details on dual connectivity are not decided yet. For example the architecture has not been agreed on yet. Therefore, many issues/details, e.g. protocol enhancements, are still open currently. FIG. 20 shows an exemplary architecture for dual connectivity. It should be only understood as one potential option; the invention is not limited to this specific network/protocol architecture but can be applied generally. The following assumptions on the architecture are made here:

Per bearer level decision where to serve each packet, C/U plane split
As an example UE RRC signalling and high QoS data such as VoLTE can be served by the Macro cell, while best effort data is offloaded to the small cell.
No coupling between bearers, so no common PDCP or RLC required between the Macro cell and small cell
Looser coordination between RAN nodes
SeNB has no connection to S-GW, i.e. packets are forwarded by MeNB
Small Cell is transparent to CN.

Regarding the last two bullet points, it should be noted that it's also possible that SeNB is connected directly with the S-GW, i.e. S1-U is between S-GW and SeNB. Essentially, there are three different options w.r.t. the bearer mapping/splitting:

Option 1: S1-U also terminates in SeNB; depicted in FIG. 21a
Option 2: S1-U terminates in MeNB, no bearer split in RAN; depicted in FIG. 21b
Option 3: S1-U terminates in MeNB, bearer split in RAN; depicted in FIG. 21c FIG. 21a-c depict those three options taking the downlink direction for the U-Plane data as an example. For explanation purposes, option 2 is mainly assumed for this application, and is the basis for FIG. 20 too.

User Plane Architecture for Small Cell Enhancement

In addition to the discussion on the splitting of the U-plane data as depicted in FIG. 21a-c, different alternatives have been discussed for the user plane architecture too.

A common understanding is that, when the S1-U interface terminates at the MeNB (FIG. 21b,c), the protocol stack in the SeNB must at least support RLC (re-)segmentation. This is due to the fact that RLC (re-)segmentation is an operation that is tightly coupled to the physical interface (e.g. MAC layer indicating size of the RLC PDU, see above), and when a non-ideal backhaul is used, RLC (re-)segmentation must take place in the same node as the one transmitting the RLC PDUs.

Based on this assumption, four families for the user plane alternatives are distinguished in the on-going discussion.

A. Independent PDCPs: this option terminates the currently defined air-interface U-plane protocol stack completely per bearer, and is tailored to realize transmission of one EPS bearer by one node, but could also support splitting of a single EPS bearer for transmission by MeNB and SeNB with the help of an additional layer. The transmission of different bearers may still happen simultaneously from the MeNB and a SeNB.

B. Master-Slave PDCPs: this option assumes that S1-U terminates in MeNB with at least part of the PDCP layer residing in the MeNB. In case of bearer split, there is a separate and independent RLC bearer, also at UE side, per eNB configured to deliver PDCP PDUs of the PDCP bearer, terminated at the MeNB.

C. Independent RLCs: this option assumes that S1-U terminates in MeNB with the PDCP layer residing in the MeNB. In case of bearer split, there is a separate and independent RLC bearer, also at UE side, per eNB configured to deliver PDCP PDUs of the PDCP bearer, terminated at the MeNB.

D. Master-Slave RLCs: this option assumes that S1-U terminates in MeNB with the PDCP layer and part of the RLC layer residing in the MeNB. While requiring only one RLC entity in the UE for the EPS bearer, on the network side the RLC functionality is distributed between the nodes involved, with a "slave RLC" operating in the SeNB. In downlink, the slave RLC takes care of the delay-critical RLC operation needed at the SeNB: it receives from the master RLC at the MeNB readily built RLC PDUs (with Sequence Number already assigned by the master) that the master has assigned for transmission by the slave, and transmits them to the UE. The custom-fitting of these PDUs into the grants from the MAC scheduler is achieved by re-using the currently defined re-segmentation mechanism.

Based thereon different architectures are proposed, which are illustrated in FIG. 22*a-i*; these are taken from the Email Discussion Report on U-Plane Alternatives, 3GPP TSG-RAN WG2 Meeting #82, R2-131621 by Nokia Siemens Networks (Rapporteur).

An overview of the main characteristics of the various alternatives illustrated in FIG. 22*a-i* is given in the following; where bearer split shall be understood as the ability to split a bearer over multiple eNBs. As can be seen from the figures, only two bearers are assumed which are indicated to come over the S1 interface.

1A: S1-U terminates in SeNB+independent PDCPs (no bearer split);
2A: S1-U terminates in MeNB+no bearer split in MeNB+independent PDCP at SeNB;
2B: S1-U terminates in MeNB+no bearer split in MeNB+master-slave PDCPs;
2C: S1-U terminates in MeNB+no bearer split in MeNB+independent RLC at SeNB;
2D: S1-U terminates in MeNB+no bearer split in MeNB+master-slave RLCs;
3A: S1-U terminates in MeNB+bearer split in MeNB+independent PDCPs for split bearers;
3B: S1-U terminates in MeNB+bearer split in MeNB+master-slave PDCPs for split bearers;
3C: S1-U terminates in MeNB+bearer split in MeNB+independent RLCs for split bearers;
3D: S1-U terminates in MeNB+bearer split in MeNB+master-slave RLCs for split bearers.

During the discussion various advantages and drawbacks are identified for each of the above alternatives.

Shortcomings of User Plane Architecture

As explained in the previous sections, small cells and dual connectivity are a recent development and still pose several problems that need to be addressed in order to allow for an efficient system.

There are problems in connection with handover scenarios with respect to protocol architectures where the PDCP layer for bearers mapped to the SeNB is residing in the MeNB, such as e.g. those of FIGS. 22*d* and 22*e*; but also those of FIGS. 22*h* and 22*i*, and depending on the later implementation of the distributed PDCP slave-master concept also those architectures of FIGS. 22*c* and 22*g*. Correspondingly, scenarios as depicted in FIGS. 21*b* and 21*c* are assumed for the invention. This will be explained in detail in the following.

In REL-8 lossless transmission is supported for acknowledged mode (AM) data radio bearers, i.e data radio bearers which are using RLC AM. Basically, the AM RLC receiver negatively acknowledges RLC PDUs that have not been received correctly using an RLC status report. Retransmission is performed repeatedly until all RLC PDUs have been received or the maximum of retransmission, which is configured by eNB, is reached. At handover, in order to also support lossless transmission, a PDCP retransmission mechanism has been introduced in Rel-8. This is necessary since the RLC status report is usually not up-to date, i.e. UE reception status might have been changed already.

This selective PDCP retransmission mechanism retransmits PDCP SDU(s) after the handover from the target eNB which were not acknowledged by the RLC entity before handover. In order to support PDCP retransmissions, the PDCP receiver is required to process the PDCP PDUs received as a result of RLC re-establishment before PDCP re-establishment. The reconstructed PDCP SDUs in the receiver side are stored in the reordering buffer if they are out-of sequence, or are delivered to higher layer otherwise. After handover, the PDCP SDUs not acknowledged before handover are retransmitted by the transmitting entity and the PDCP receiver reorders them together with the SDUs stored in the reordering buffer. For the reordering to work, all PDCP state variables, including COUNT and also PDCP sequence numbers, need to be maintained at handover.

PDCP retransmission can be further optimized by using a PDCP status report. As mentioned above the RLC status report might not be up-to-date, i.e. even though the reception of a PDCP SDU has not been acknowledged by the RLC status report, it is possible that the PDCP SDU has been transmitted successfully before handover. Therefore, there might be some unnecessary retransmissions of PDCP SDUs after handover. In order to avoid those, the PDCP receiver sends a PDCP status report to the PDCP transmitter after handover. The PDCP status report describes the latest reordering buffer status of the PDCP receiver, so that unnecessary retransmissions can be avoided.

In the scope of dual connectivity there are new mobility events compared to Rel8 handover or Rel-10 carrier aggregation mobility events. In order to explain some problems underlying the present invention, we focus on the mobility event where UE is in dual connectivity, i.e. UE has established a connection to MeNB and also to a SeNB, and changes its SeNB. This is illustrated in FIG. 23. At SeNB change, i.e. MeNB is not changed, radio bearers (in this example radio bearer #1 as part of EPS bearer #1) which where transmitted via the source SeNB (SeNB connected to before mobility event) are mapped to target SeNB (SeNB connected to after SeNB change).

It should be noted that the invention is also applicable to other mobility scenarios, e.g. where UE being in dual connectivity will move to single connectivity, i.e. only connected to Macro cell. This is depicted in FIG. 24. Bearers previously mapped to the source SeNB are, after the mobility event, served by the MeNB. The invention also applies to cases where the UE changes the MeNB as well as the SeNB, and may also change to single connectivity of a single new MeNB (i.e. without a new SeNB) (not depicted).

For the following explanation, the scenario of FIG. 23 is assumed. Since the PDCP layer resides in the MeNB (see e.g. FIG. 22d), the PDCP layer will not be re-established for the SeNB change. Correspondingly, the MeNB will, after SeNB change, forward the PDCP PDUs to the new SeNB2. In order to also support lossless transmission at SeNB for AM DRBs, PDCP SDUs which are not acknowledged by RLC layer before, are retransmitted by the new SeNB2 after SeNB change. However, since MeNB has no up-to-date knowledge of RLC/PDCP reception status before SeNB change, unnecessary PDCP SDU retransmission after SeNB change might be the consequence. It should be noted that since no PDCP re-establishment is performed, no PDCP status report will be triggered.

SUMMARY OF THE INVENTION

One object of the invention is to provide an improved method for a lossless change of connection between the mobile station and a source secondary base station and a target base station. The object is solved by the subject matter of the independent claims. Advantageous embodiments are subject to the dependent claims.

For the first aspect of the invention, it is assumed that the mobile station is in dual connectivity and thus connected to both a master base station and a secondary base station via respective at least one radio bearer. The mobile station is at least receiving data packets which are forwarded from the master base station via the secondary base station to the mobile station. A protocol stack including a higher layer (e.g. PDCP layer), having a function of compiling and transmitting a status report, is located at the master base station, but not at the secondary base station. The secondary base station also has a protocol stack, but rather than having said particular higher layer of the master base station (e.g. PDCP layer), it does have a lower layer, which is the layer below the higher layer of the master base station (e.g. RLC layer). Correspondingly, the data packets are forwarded from the higher (e.g. PDCP) layer of the master base station to the lower (e.g. RLC) layer at the secondary base station. Correspondingly, the mobile station is receiving data packets from its secondary base station, which in turn receives same from the master base station. The data packets are acknowledged by the mobile station in a usual manner.

It is further assumed for explanatory purposes only that the communication system in which the mobile station is currently located has at least one master base station and at least two secondary base stations. The mobile station is further assumed to be moving and to eventually perform a handover from the source secondary base station to another base station, be it the master base station, another new master base station or a target secondary base station. In any case, at least the radio bearers that are connecting the mobile station to the source secondary base station need to be remapped/reconfigured to this other target base station when performing the handover.

According to this first aspect of the invention, an efficient and lossless handover procedure shall be implemented. In particular, when said radio bearers going via the source secondary base station are (or are to be) reconfigured from the source secondary base station to another base station due to a mobility event, the mobile station shall prepare and transmit a status report as follows. The status report comprises information on the reception status of the data packets received so far by the mobile station via all of the data radio bearer going via the source secondary base station. In view of that the status report may comprise information on more than one data radio bearer, the information in the status report shall be accompanied by a corresponding radio bearer identifier of that radio bearer to which the information pertains. Therefore, the receiving entity, i.e. eventually the master base station as the destination of the status report, can infer which data packets transmitted via which data radio bearers have been already received correctly by the mobile station and which not. Correspondingly, the master base station may thus forward only those of the data packets to the target secondary base station which have not yet been successfully received by the mobile station.

According to one implementation of the first aspect, the concatenation of information relating to different radio bearers is indicated and distinguished in the status report by use of an extension flag after each set of information, comprised of reception status and radio bearer identifier. Put differently, the status report comprises for each data radio bearer which is to be remapped away from the source secondary base station to the target: the reception status information of data packets going via said data radio bearer, the corresponding radio bearer identifier of said data radio bearer and an extension flag. The extension flag indicates that the reception status information and radio bearer identifier relating to another data radio bearer are included in the status report too.

According to one particular exemplary implementation of the first aspect, the status report is the PDCP status report compiled by a PDCP layer entity in the mobile station, and which comprises information on the reception status of PDCP SDUs received by the mobile station via all of the at least one data radio bearer going via the source secondary base station.

According to the prior art, in the above assumed scenario no status report would be transmitted since the higher layer (e.g. PDCP layer) which is responsible for compiling and transmitting said status report is not re-established due to being located in the master base station but not in the (source) secondary base station. According to this first aspect of the invention however, the status report shall be compiled and transmitted nonetheless in order to provide the master base station with the necessary information on missing data packets, and thus to avoid the re-transmission of already correctly received data packets by the target base station to the mobile station. According to one implementation, the trigger for the mobile station to start preparing and eventually transmit the status report is the RRC Connection Reconfiguration message which is received by the mobile station from the base station where RRC protocol layer resides, e.g. master base station.

However, since the status report relates to the data radio bearers which go via the source base station, the status report is usually to be transmitted via said data radio bearers, and thus incurs the unwanted backhaul delay. In order to avoid the backhaul delay between the master base station and the target secondary base station which can be significant, the status report may be advantageously be transmitted by the mobile station directly to the master base station, e.g. via one of the at least one radio bearer which is established directly between the mobile station and the master base station, be it a signalling radio bearer or a data radio bearer. In other words, the status report, basically comprising information regarding particular data radio bearers (going via the source secondary base station) is transmitted from the mobile station via another radio bearer to the master base station.

For example, in case the status report is to be transmitted via a signalling radio bearer to the master base station, this may be done as part of an RRC message, e.g. the RRC Connection Reconfiguration Complete message which is a response message for the RRC Connection Reconfiguration message which, according to one implementation, can be used as trigger by the mobile station for compiling and transmitting the status report as mentioned above.

In case the status report is to be transmitted via a data radio bearer to the master base station, this may be done according to one particular exemplary implementation as a PDCP control PDU, in a similar manner as the usual PDCP status report known from the prior art; albeit, as a third PDCP control PDU type with a different format as explained above.

In a still further alternative on how to transmit the status report directly to the master base station to avoid the backhaul delay, the status report can be transmitted as a MAC control element; in other words, a MAC control element comprising the status report (with the content as explained above) is transmitted by the mobile station directly to the master base station as a physical channel transmission, i.e. lower layer transmission without relating to any radio bearer.

Since the status report is transmitted to the master base station via another radio bearer, a radio bearer which is not being remapped (provided the master base station is not changed too), the status report can be sent even before the SeNB change is finished. This has the advantage that the PDCP status information is received by the PDCP layer in the master base station so timely, that PDCP layer can make use of this information when determining which PDCP SDU to forward to the target SeNB for retransmission. In other words this allows master eNB to forward only those packets (PDCP SDUs) which haven't been received by the mobile station before the mobility event, i.e. forwarding of unnecessary data packets is hence avoided.

In the above the first aspect is mainly explained from the viewpoint of the mobile station, which receives data packets from the master base station via the secondary base station, and, when performing a handover, compiles and transmits a status report. However, the principles as explained above are equally applicable from the viewpoint of the master base station, which is the other end point of the higher layer implementing the function of the status report compiling and transmitting. In the same manner, the master base station when it has been decided about the handover of the mobile station from the source secondary base station to another target base station (be it another secondary base station, the master base station or another master base station), compiles the status report, by comprising information on the reception status of data packets received so far by the master base station from the mobile station via all of the data radio bearer going via the source secondary base station. The format of the status report may be the same as explained above in connection with the status report prepared by the mobile station; i.e. comprising for each of these data radio bearers going via the source secondary base station the reception status information, the corresponding radio bearer identifier and an extension flag (see above details).

Furthermore and also in line with the principles already explained above, the status report prepared by the master base station shall advantageously be transmitted directly to the mobile station thus avoiding the detour and corresponding backhaul delay between the master base station and the secondary base station. As before, this may be realized by the transmission of the status report from the master base station via one of the radio bearers established and available to the mobile station, be it a signalling or data radio bearer. Again, RRC messages may be used in connection with a signalling radio bearer, or a third type of PDCP control PDU in connection with a data radio bearer, or a MAC CE to transmit the status report.

A first embodiment of the invention provides a method for transmitting a status report by a mobile station, wherein the mobile station is connected via at least one radio bearer to a master base station and via at least one data radio bearer to a source secondary base station. When reconfiguring the at least one data radio bearer of the mobile station from the source secondary base station to a target base station, transmitting by the mobile station a status report. The status report comprises information on the reception status of data packets received by the mobile station via all of the at least one data radio bearer connecting the mobile station to the source secondary base station, and comprises one radio bearer identifier for each of the at least one data radio bearer which information is comprised in the status report.

The first embodiment further provides a mobile station for transmitting a status report, wherein the mobile station is connected via at least one radio bearer to a master base station and via at least one data radio bearer to a source secondary base station. A processor and transmitter of the mobile station transmit a status report, when the at least one data radio bearer of the mobile station is reconfigured from the source secondary base station to a target base station. The status report comprises information on the reception status of data packets received by the mobile station via all of the at least one data radio bearer connecting the mobile station to the source secondary base station, and comprises one radio bearer identifier for each of the at least one data radio bearer which information is comprised in the status report.

The first embodiment of the invention further provides a master base station for processing a status report transmitted from a mobile station, wherein the mobile station is connected via at least one radio bearer to the master base station and via at least one data radio bearer to a source secondary base station. A receiver and processor of the master base station receive and process a status report from the mobile station, when reconfiguring the at least one data radio bearer of the mobile station from the source secondary base station to a target base station. The status report comprises information on the reception status of data packets received by the mobile station via all of the at least one data radio bearer connecting the mobile station to the source secondary base station, and comprises one radio bearer identifier for each of the at least one data radio bearer which information is comprised in the status report.

BRIEF DESCRIPTION OF THE FIGURES

In the following the invention is described in more detail with reference to the attached figures and drawings.

FIG. 22*a-i* illustrate the different user plane architecture alternatives currently discussed in connection with dual connectivity in the MeNB and SeNB, FIG. 29 illustrates the message exchange according to still another implementation of the first embodiment in the context of part of the handover procedure, FIG. 30 illustrates the format of the enhanced PDCP status report according to one implementation of the first embodiment, and FIG. 31 illustrates the format of the enhanced PDCP status report according to other implementations of the first embodiment.

DETAILED DESCRIPTION OF THE INVENTION

A mobile station or mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The term "master base station" used in the claims and throughout the description of the invention is to be construed as used in the field of dual connectivity of 3GPP LTE-A; thus, other terms are macro base station, or master/macro eNB; or serving base station or any other terminology to be decided later by 3GPP. Similarly, the term "secondary base station" used in the claims and throughout the description is to be construed as used in the field of dual connectivity of 3GPP LTE-A; thus, other terms are slave base station, or secondary/slave eNB or any other terminology to be decided later by 3GPP.

Figure 1:
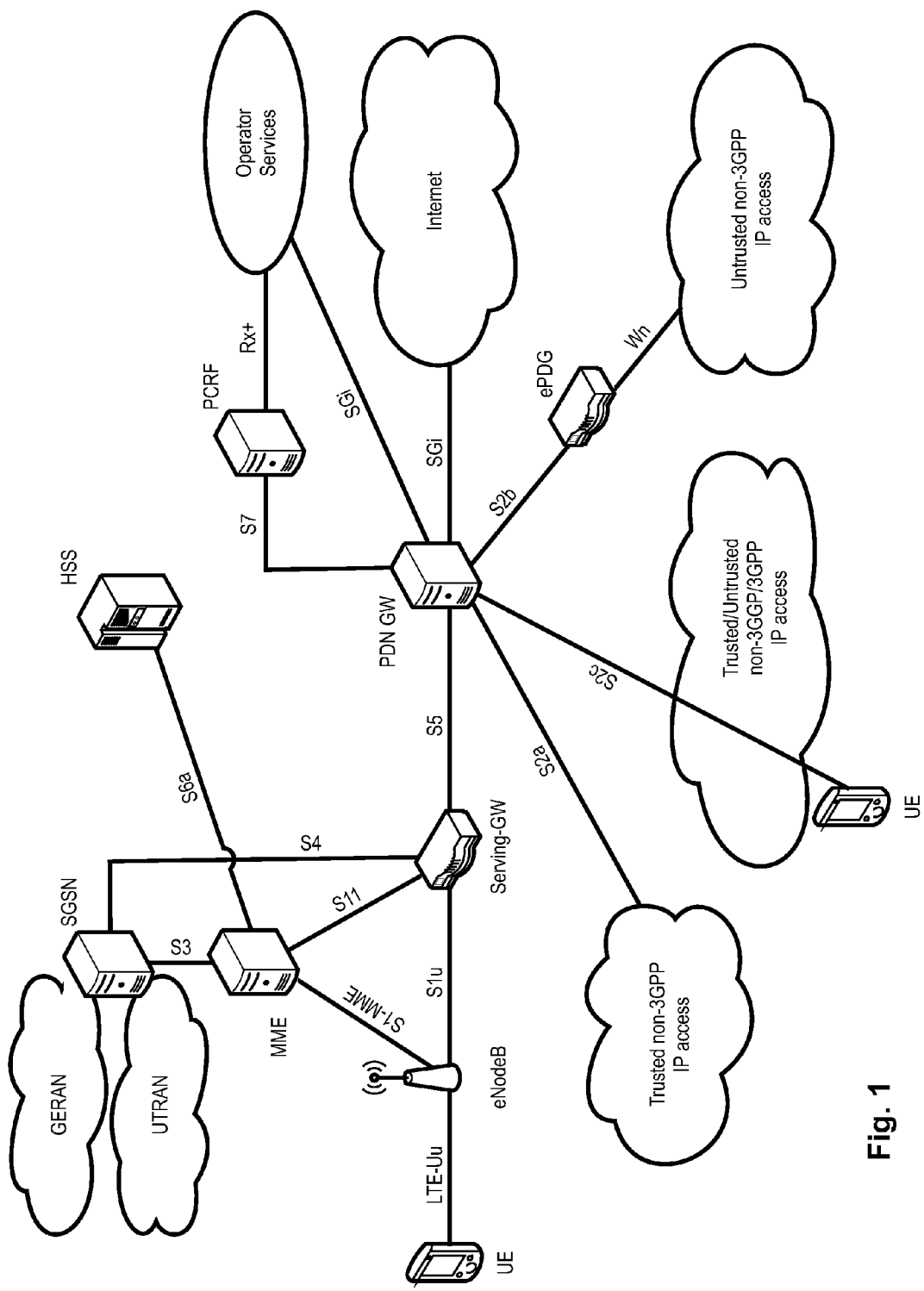
FIG. 1 shows an exemplary architecture of a 3GPP LTE system.
Figure 2:
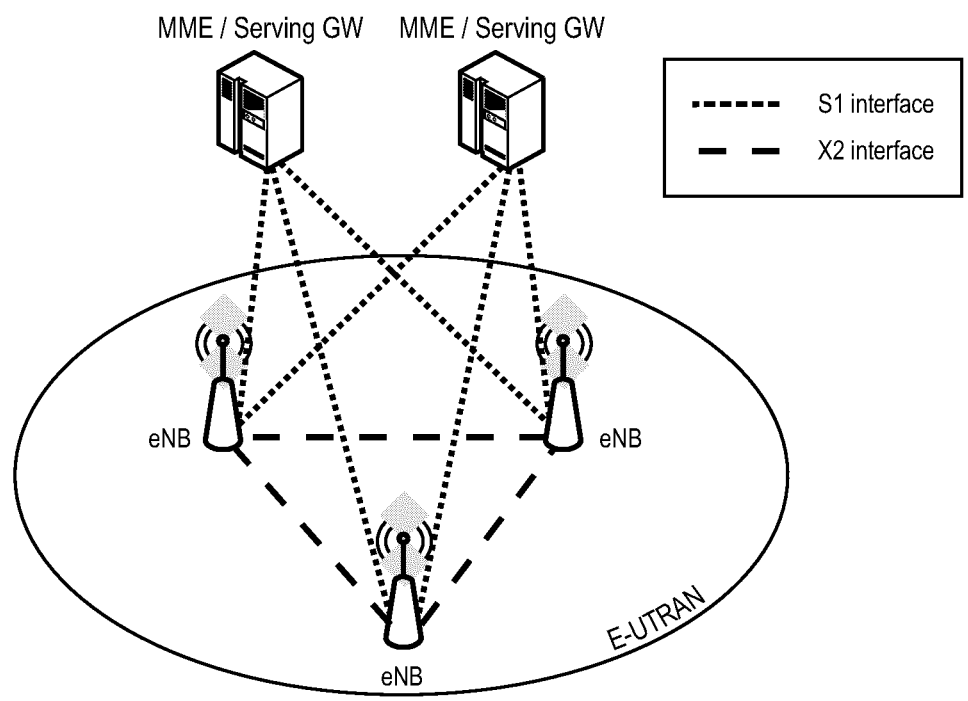
FIG. 2 shows an exemplary overview of the overall E-UTRAN architecture of 3GPP LTE.
Figure 3:
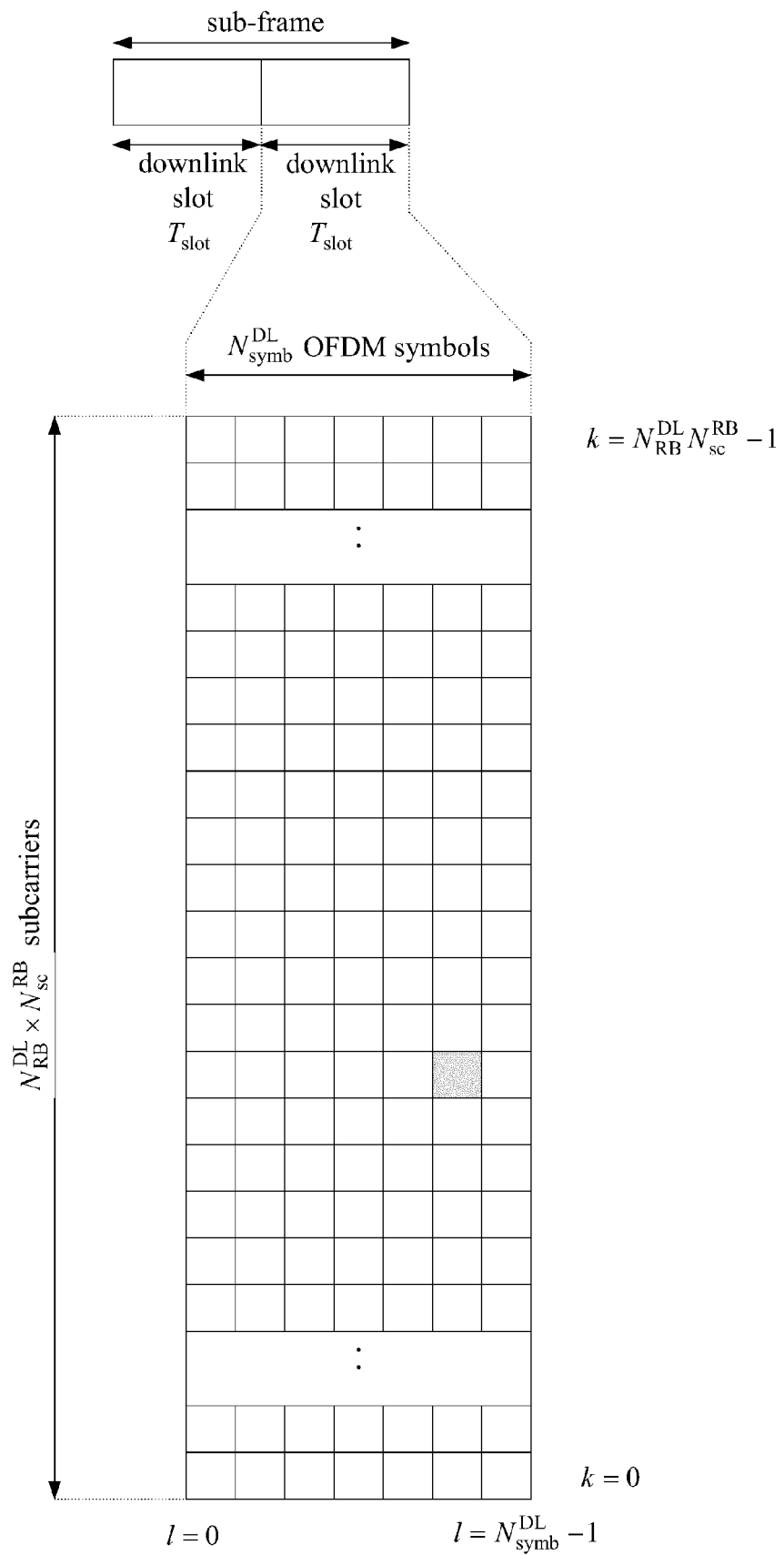
FIG. 3 shows exemplary subframe boundaries on a downlink component carrier as defined for 3GPP LTE (Release 8/9)
Figure 4:
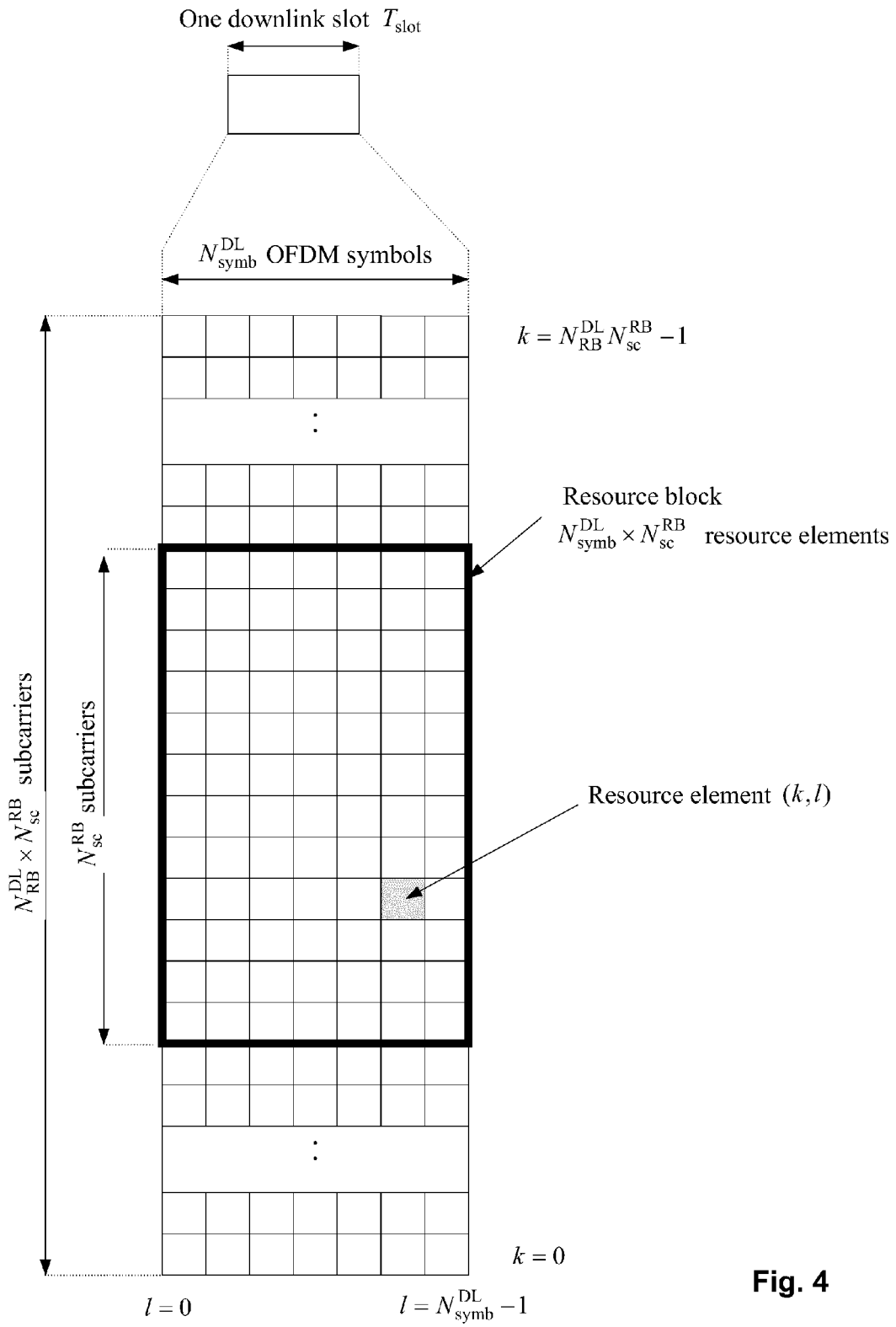
FIG. 4 shows an exemplary downlink resource grid of a downlink slot as defined for 3GPP LTE (Release 8/9)
Figure 5:
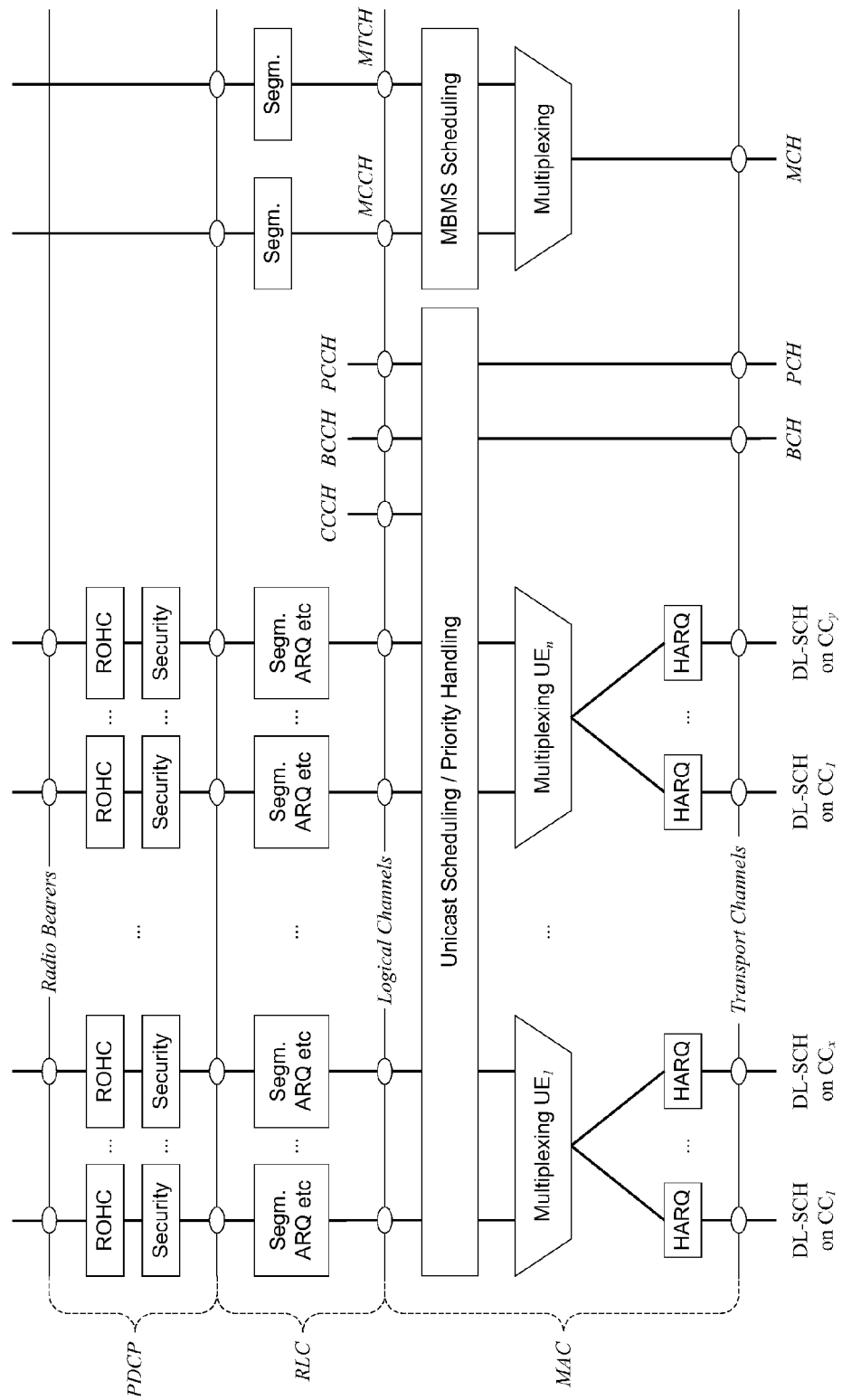
FIGS. 5 & 6 show the 3GPP LTE-A (Release 10) Layer 2 structure with activated carrier aggregation for the downlink and uplink, respectively.
Figure 6:
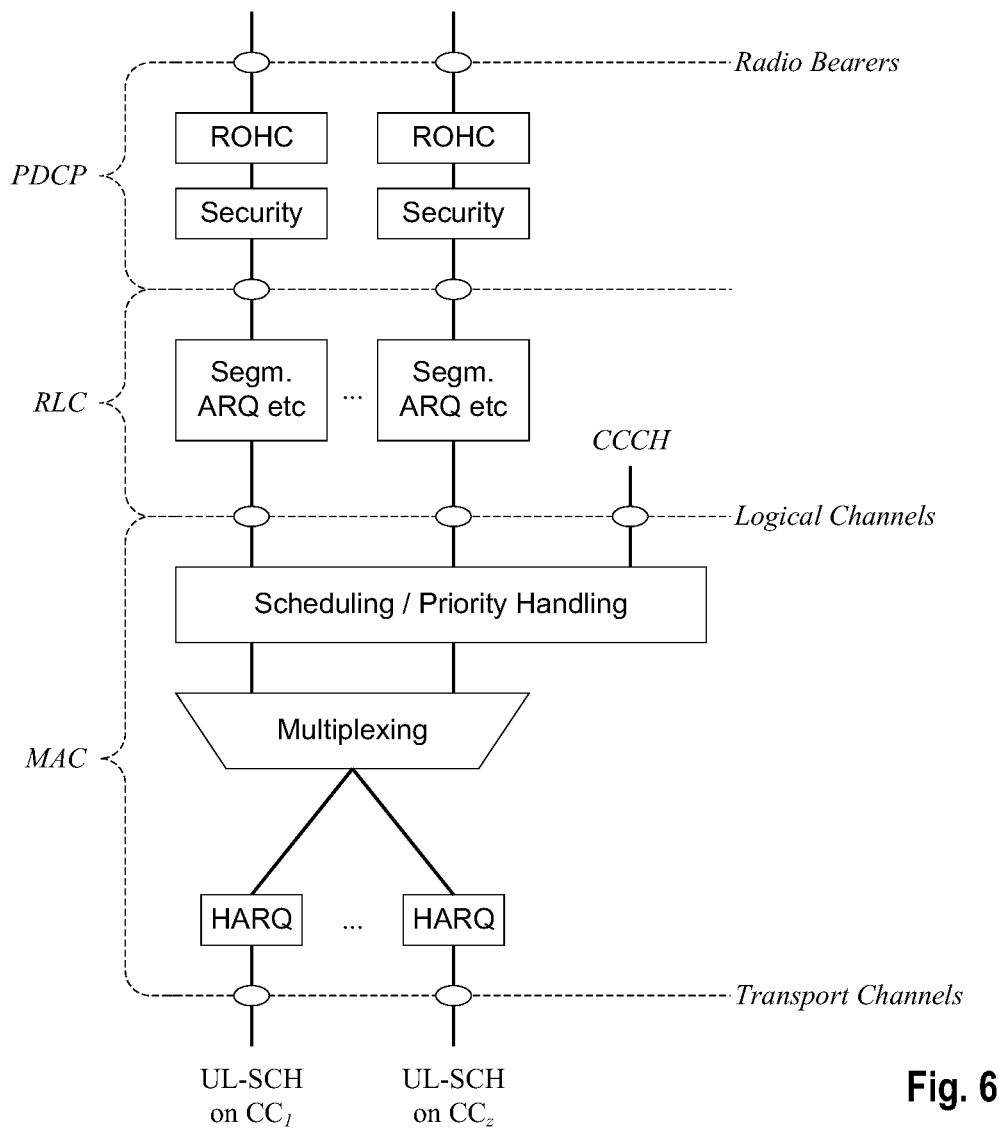
Figure 7:
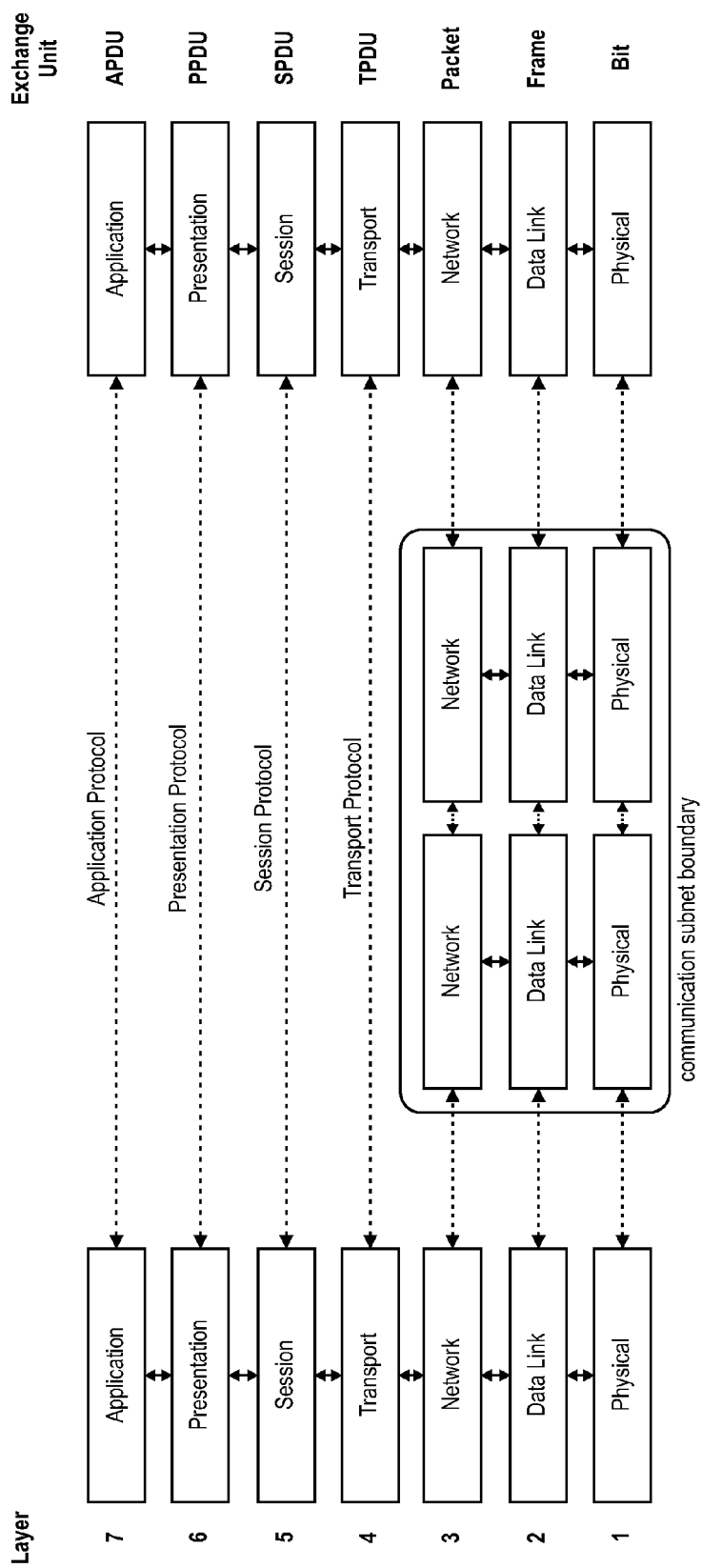
FIG. 7 illustrates the OSI model with the different layers for communication.
Figure 8:
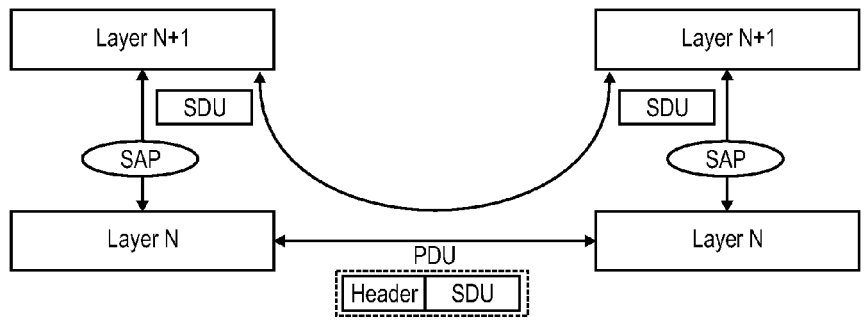
FIG. 8 illustrates the relationship of a protocol data unit (PDU) and a service data unit (SDU) as well as the inter-layer exchange of same.
Figure 9:
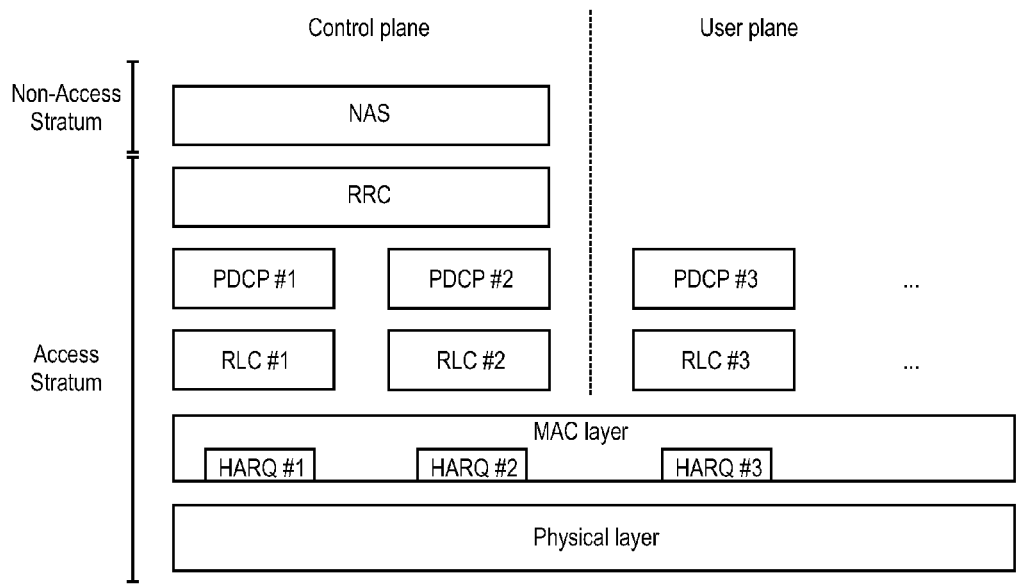
FIG. 9 illustrates the layer 2 user and control-plane protocol stack composed of the three sublayers, PDCP, RLC and MAC, FIG. 10 gives an overview of the different functions in the PDCP, RLC and MAC layers as well as illustrates exemplary the processing of SDUs/PDUs by the various layers.
Figure 10:
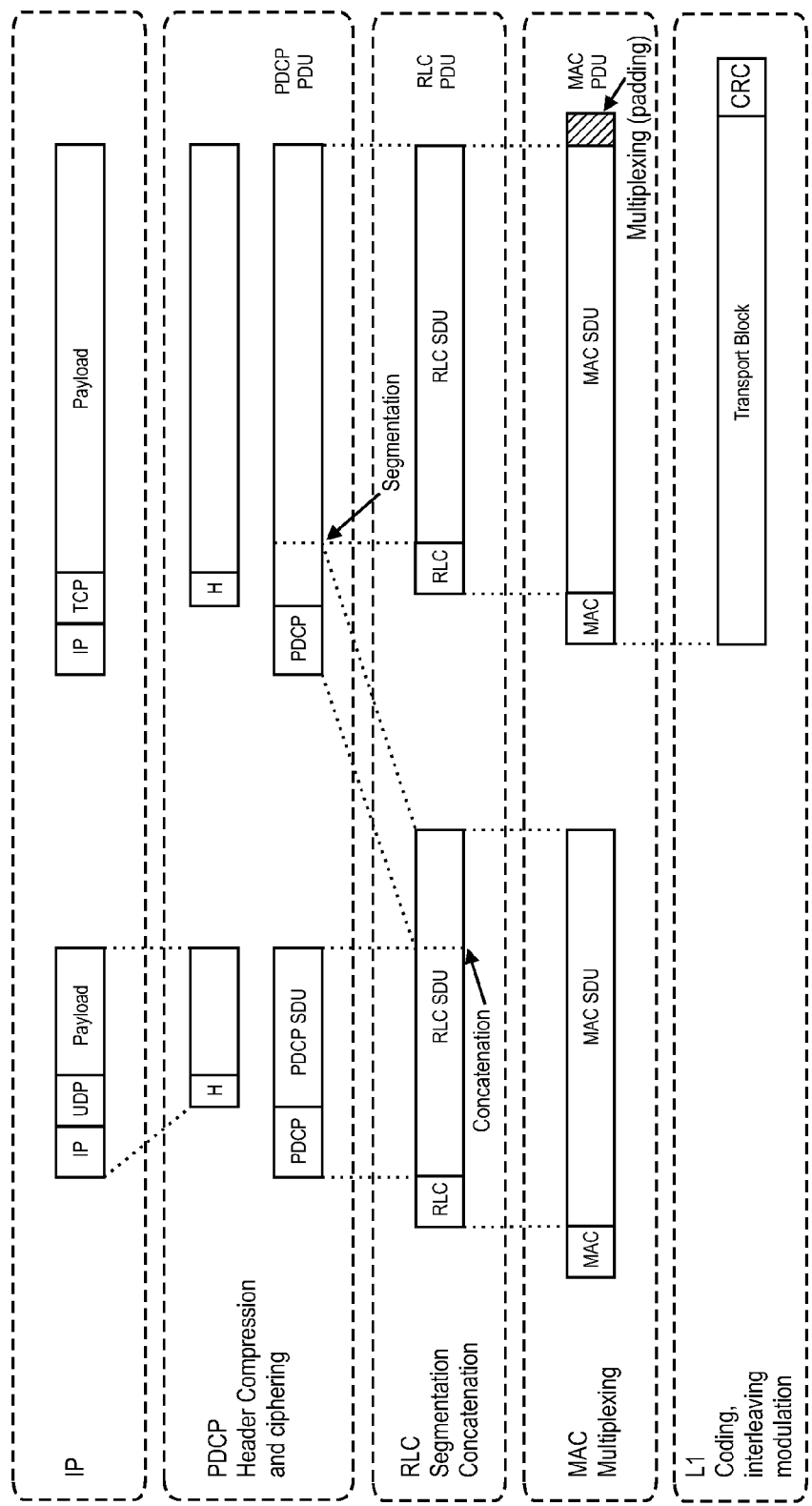
Figure 11:
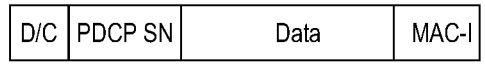
FIGS. 11 and 12 illustrate a Data and Control PDU respectively.
Figure 12:

The term "radio bearer" used in the claims and throughout the description of the invention is to be construed in connection with 3GPP terminology, and refers to a virtual connection between two endpoints, i.e. mobile station and base station, which is used for transport of data between those; a term that emphasizes the fact that the virtual connection provides a "bearer service", i.e. a transport service with specific QoS attributes. A data radio bearer may also be called user plane radio bearer, and a signaling radio bearer may also be called control plane radio bearer. A radio bearer shall be distinguished from other terminology as defined by 3GPP, such as S1 bearer, E-RAB, S5/S8 bearer, EPS bearer etc. (see also FIG. 2.8 of LTE—The UMTS Long Term Evolution FROM THEORY TO PRACTICE, Edited by: Stefania Sesia, Issam Toufik, Matther Baker, Second Edition, ISBN 978-0-470-66025-6, incorporated herein by reference).

The term "reception status" used in the claims and throughout the description of the invention refers to information from which an entity can infer which data packets have been already received correctly, and which data packets have not been already received correctly and thus need re-transmission. In the particular embodiment referring to the PDCP status report, the reception status refers to PDCP SDUs and in particular e.g. to the latest reordering buffer status of the PDCP receiver.

The term "radio bearer identifier" used in the claims and throughout the description of the invention refers to information providing an identification of a radio bearer.

In the following, several embodiments of the invention will be explained in detail. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the invention may be advantageously used for example in a mobile communication system such as 3GPP LTE-A (Release 12) communication systems as described in the Technical Background section above. These embodiments are described as implementations for use in connection with and/or for enhancement of functionality specified in 3GPP LTE and/or LTE-A. In this respect, the terminology of 3GPP LTE and/or LTE-A is employed throughout the description. Further, exemplary configurations are explored to detail the full breadth of the invention.

The explanations should not be understood as limiting the invention, but as a mere example of the invention's embodiments to better understand the invention. A skilled person should be aware that the general principles of the invention as laid out in the claims can be applied to different scenarios and in ways that are not explicitly described herein. Correspondingly, the following scenarios assumed for explanatory purposes of the various embodiments shall not limit the invention as such.

First Embodiment

In connection with the first embodiment of the invention, various implementations will be explained. To simplify the illustration of the principles of the first embodiment, several assumptions are made; however, it should be noted that these assumptions should not be interpreted as limiting the scope of the present application, as broadly defined by the claims.

Figure 21A:
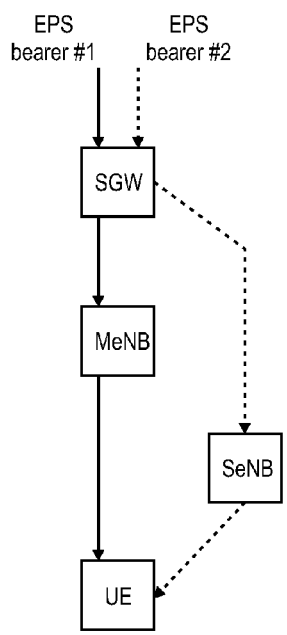
FIG. 21*a-c* illustrate the different options for having two separate EPS bearers between the SGW and the UE.
Figure 21B:
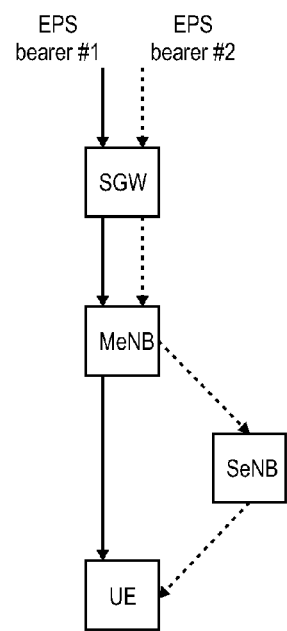
Figure 21C:
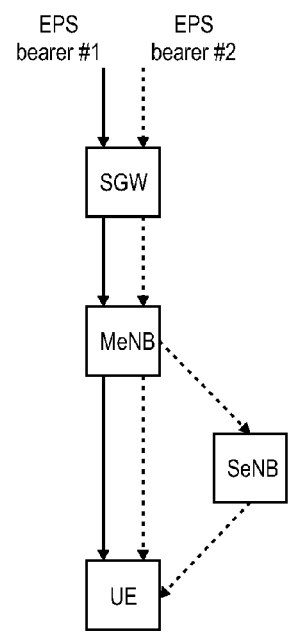
Figure 23:
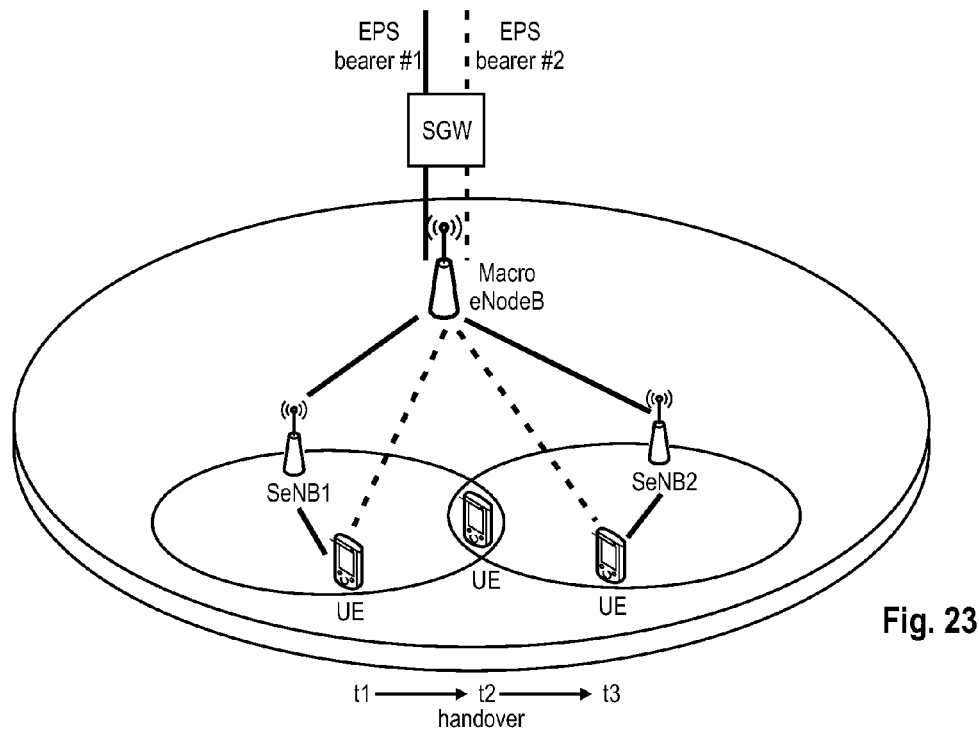
FIG. 23 illustrates a scenario where a UE changes its connection from a source SeNB1 to a target SeNB2, while maintaining its connection to the MeNB.
Figure 24:
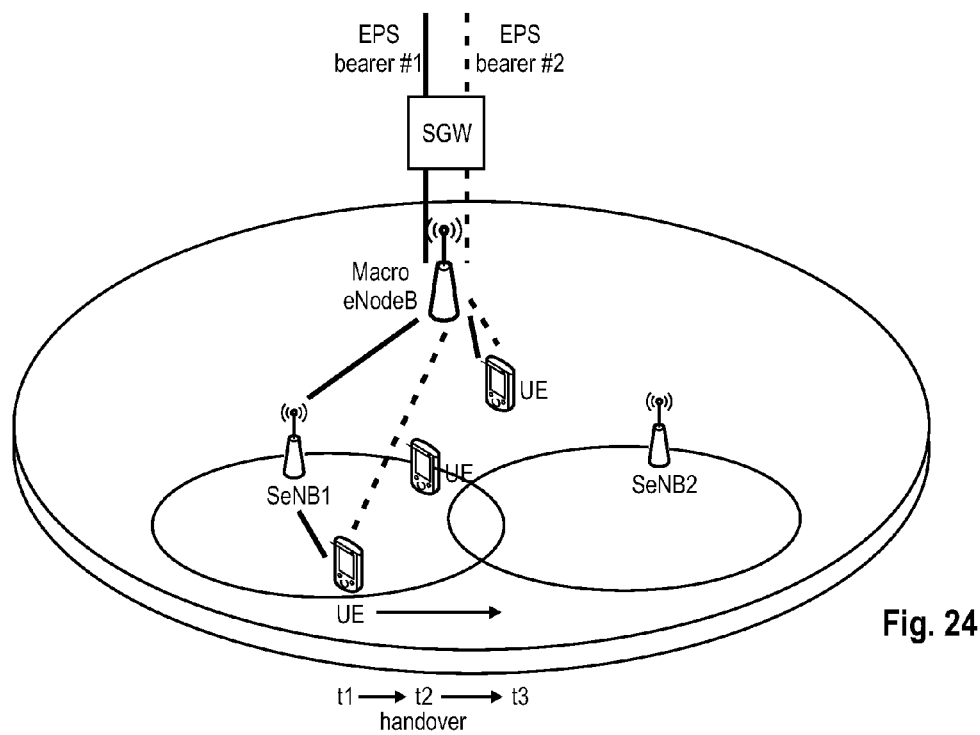
FIG. 24 illustrates a scenario where a UE changes its connection from a source SeNB1 to the MeNB, while maintaining its connection to the MeNB.

The first embodiment of the invention will be described with reference to FIGS. 25 to 31. A dual connectivity scenario in a small cell environment is assumed, where the UE is connected to both the MeNB and the SeNB, and at least receives data that is forwarded from the SGW to the MeNB, and finally via the SeNB to the UE; i.e. as illustrated exemplary in FIGS. 21*b* and 21 *c* in connection with EPS bearer #2. As indicated, the EPS bearer #2 (including the radio bearer #2 between the UE and the MeNB) can either be split in the MeNB such that the radio bearer can be transmitted via both eNBs as needed (see FIG. 21*c*) or is not split in the MeNB but forwarded separately from EPS bearer #1 (see FIG. 21*b*)

According to the small cell discussion in 3GPP, different user plane architectures have been under discussion as explained in the background section with reference to FIG. 22. For the first embodiment of the invention, it is assumed that mainly the user plane architectures of FIG. 22*d*, 22*e* are assumed, where the PDCP layer with the PDCP status report function is located at the MeNB but not at the SeNB. Nevertheless, the principles as explained in the following for the first embodiment can also be applied to the user architectures of FIG. 22*h*, 22*i* even though in these architectures the corresponding EPS bearer #2 is split in the MeNB such that there is a direct connection between the UE and the MeNB thus allowing to transmit the normal PDCP status report directly to the MeNB without the backhaul delay introduced by the detour via the SeNB. Furthermore, the principles as explained in the following for the first embodiment can also be applied to the user architectures of FIG. 22*c*, 22*g* where the PDCP layer is distributed between the MeNB and the SeNB; in these cases it is still unclear from the current standardization point of view which particular functionality will be actually implemented in the MeNB and which in the SeNB.

Figure 25:
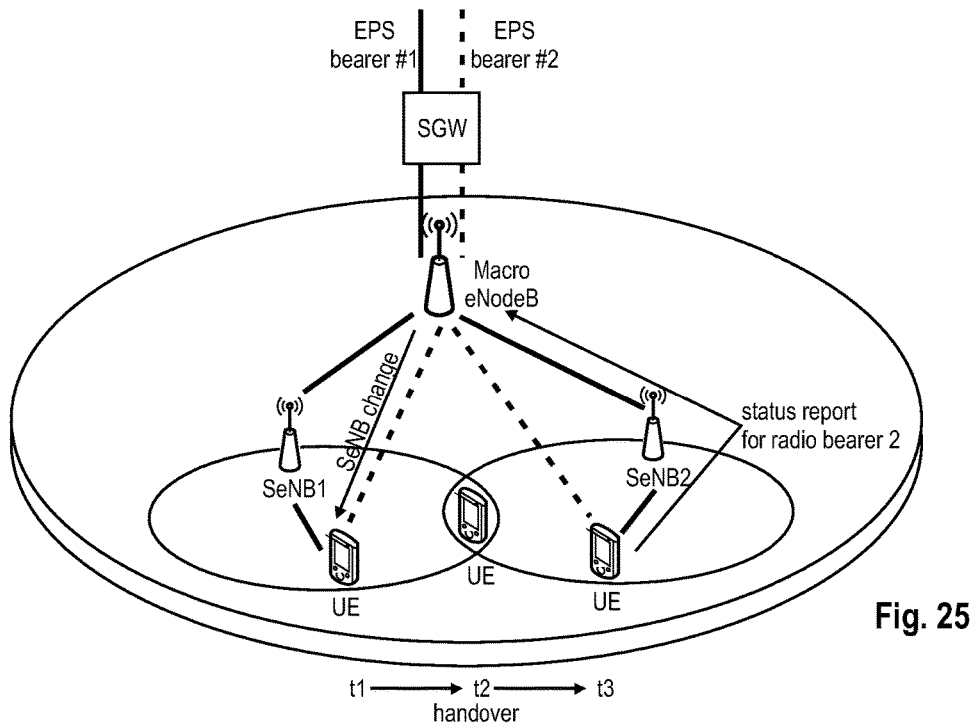
FIG. 25 illustrates the scenario as introduced by FIG. 23, and further shows a simplified message exchange according to one implementation of the first embodiment.
Figure 26:
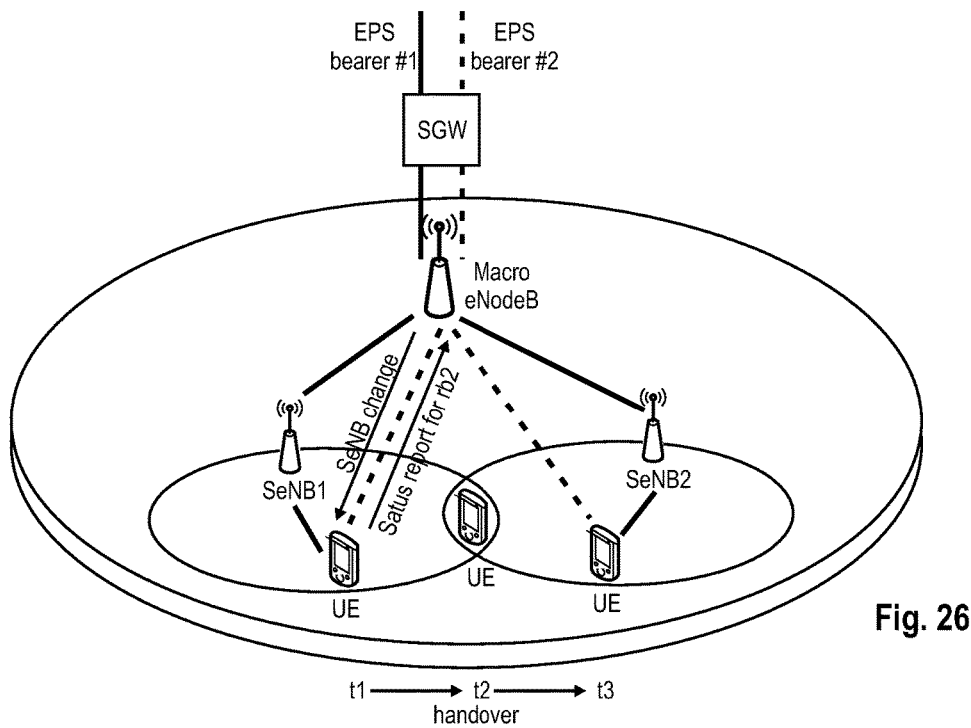
FIG. 26 illustrates the scenario as introduced by FIG. 23, and further shows a simplified message exchange according to another implementation of the first embodiment.

The first embodiment will now be explained in connection with FIG. 25, which discloses a handover scenario where the UE moves from the coverage of one SeNB1 to another SeNB2 and thus performs a handover between these two eNBs, while being always under coverage of the MeNB. FIG. 25 takes some assumptions for facilitating the illustration of the principles of the first embodiment. In particular, it is assumed that the underlying communication system includes a MeNB with two SeNBs, SeNB1 and SeNB2. Further, it is assumed that there are only two EPS bearer #1 and #2, where EPS bearer #2 goes via the MeNB directly to the UE, and EPS bearer #1 indirectly goes via the MeNB and via the SeNB1 to the UE. Correspondingly, when moving and performing a handover only the part of EPS bearer #1 that goes via the SeNB1, in this particular case the radio bearer #1 (being part of EPS bearer #1) between the UE and SeNB1, has to be remapped to the target SeNB2. It should be noted that the data radio bearer are configured for RLC AM as already mentioned before.

Of course, although the exemplary scenario of FIG. 25 (and other figures) only assumes two EPS bearers in total, there may be many more bearers established between the UE, MeNB and SeNB respectively, and the first embodiment of the invention also applies to these.

Figure 15:
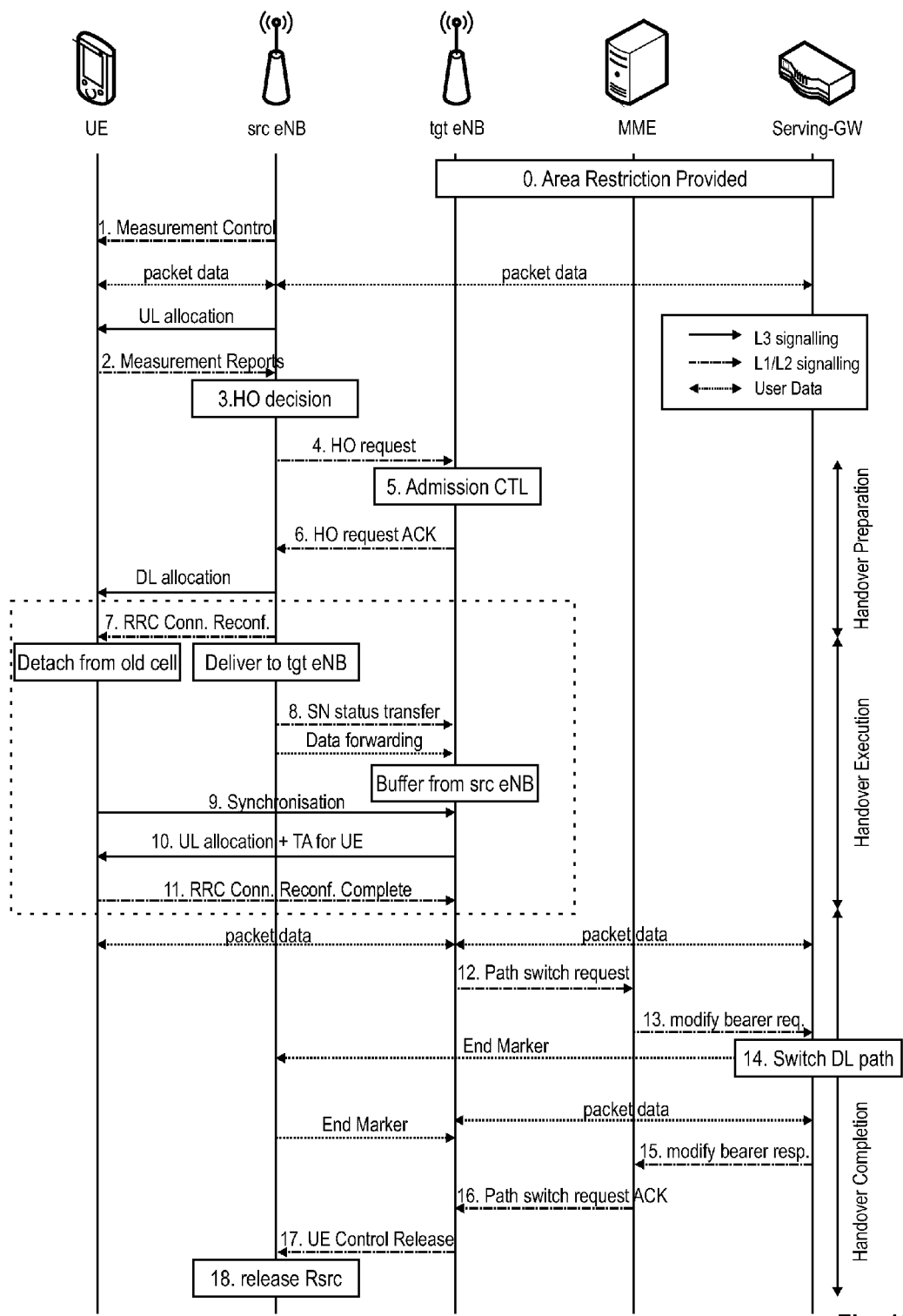
FIG. 15 shows a sequence diagram of an Intra-MME/Serving Gateway Handover procedure as defined in 3GPP LTE Release 8/9.
Figure 16:
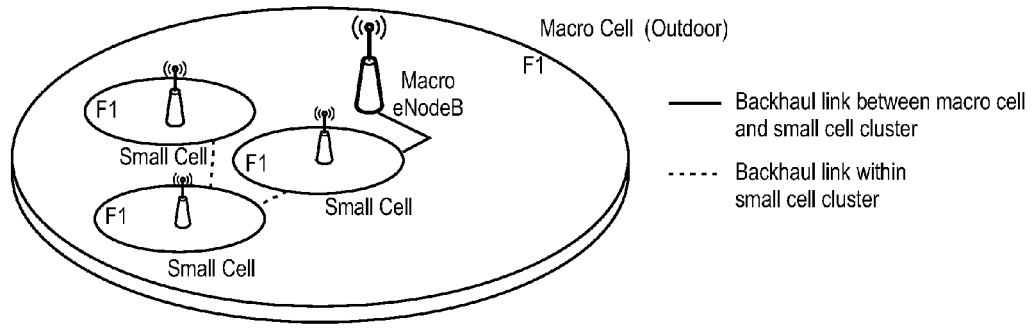
FIG. 16 illustrates a deployment scenario for small cell enhancement, where macro and small cells are on the same carrier frequency.
Figure 17:
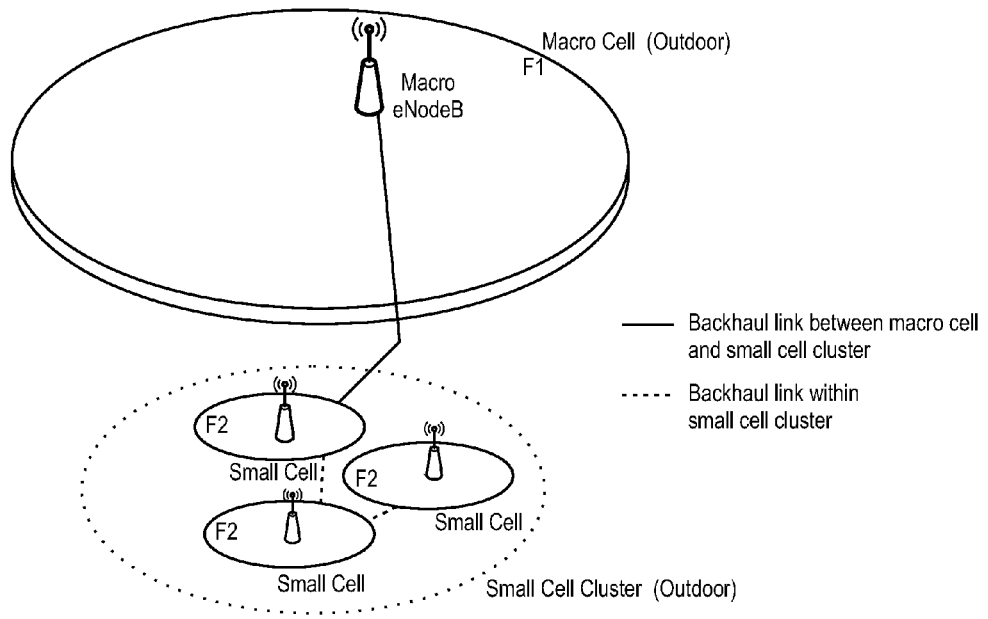
FIGS. 17 and 18 illustrate further deployment scenarios for small cell enhancement where macro and small cells are on different carrier frequencies, the small cell being respectively outdoor and indoor.
Figure 18:
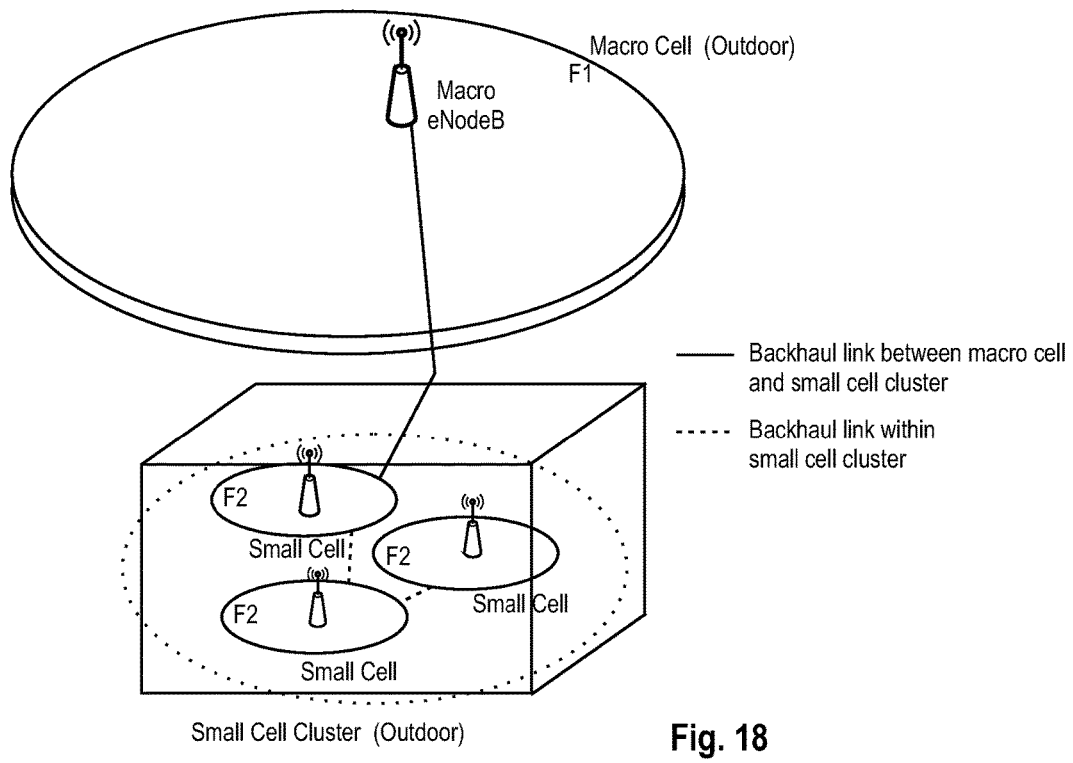
Figure 19:
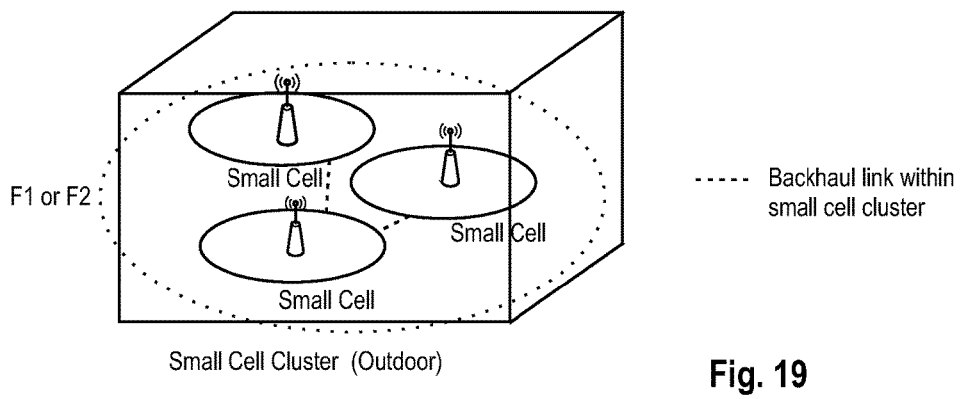
FIG. 19 illustrates a further deployment scenario for small cell enhancement with only small cells, FIG. 20 gives an overview of the communication system architecture for dual connectivity with macro and small eNBs connected to the core network, where the S1-U interface terminates in the Macro eNB and no bearer splitting is done in RAN.
Figure 20:
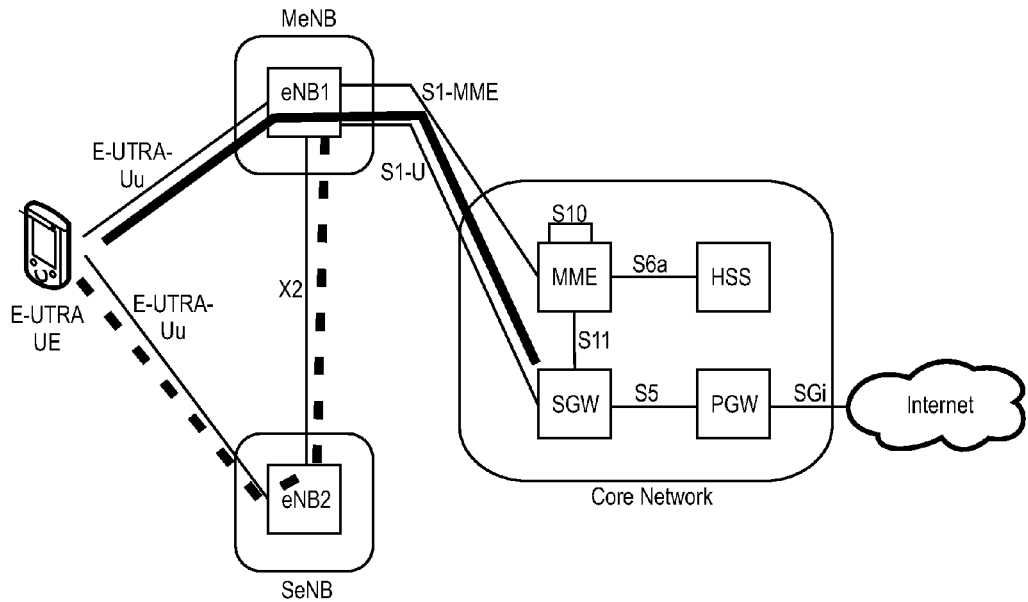
Figure 27:
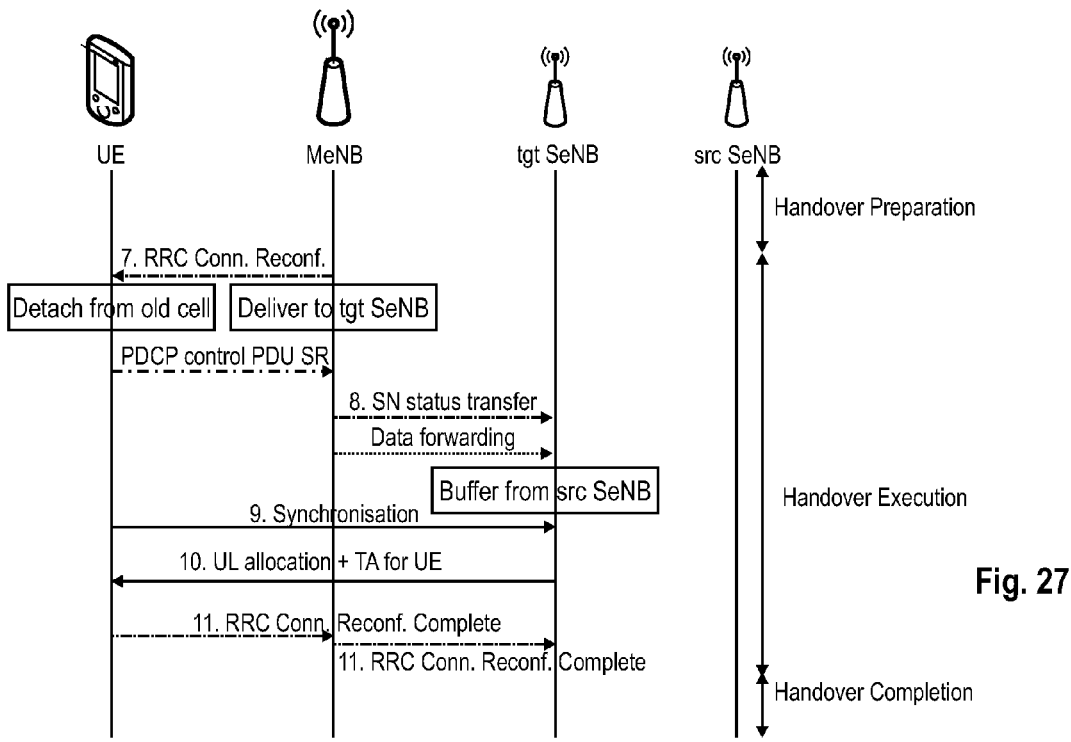
FIG. 27 illustrates the message exchange according to one implementation of the first embodiment in the context of part of the handover procedure.
Figure 28:
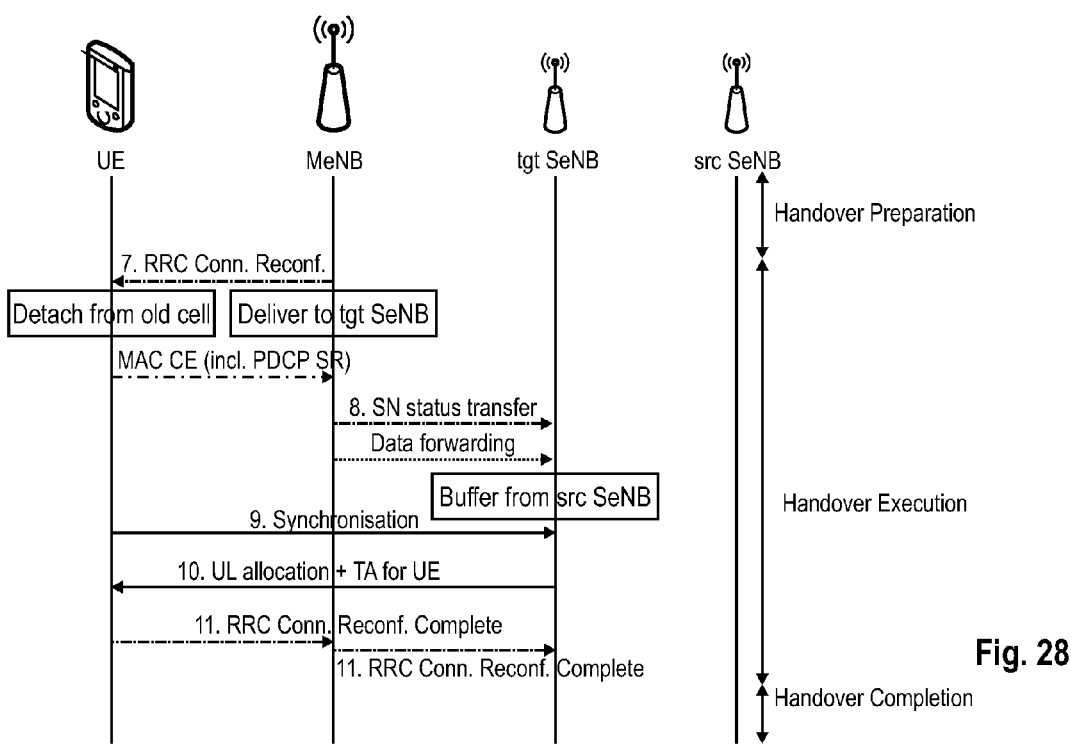
FIG. 28 illustrates the message exchange according to another implementation of the first embodiment in the context of part of the handover procedure.

It is assumed that the UE will eventually perform the handover, which will most likely be decided by the MeNB. Correspondingly, the MeNB (as having the RRC connection to the UE, unlike the SeNBs) will inform the UE about the imminent handover in the usual manner (see also explanation regarding FIG. 15) by transmitting an RRC Connection Reconfiguration message, as depicted in FIGS. 27, 28 and 29. In one exemplary implementation of the first embodiment, the UE takes the RRC Connection Reconfiguration message as trigger for first compiling and then transmitting a PDCP status report, which contains information as follows. According to one exemplary implementation of the first embodiment the indication the RRCConnectionReconfiguration message is not including mobilityControlInformation. The procedure and associated signaling for changing of a SeNB (from source SeNB to target SeNB) is according to this exemplary implementation similar to the procedure for changing (release and add) a Scell in the scope of carrier aggregation. It should be noted however that also another (dedicated) trigger message (not the RRC Conn. Reconf. Message) may be used by the MeNB to trigger the enhanced PDCP status reporting.

Correspondingly, the PDCP layer of the UE gathers the necessary information and prepares the enhanced PDCP status report of the first embodiment. The PDCP receiver processes the received PDCP PDUs as a result of RCL re-establishment and stores the reconstructed PDCP SDUs in the reordering buffer. The PDCP status information generated by the mobile terminal represents the latest reordering buffer status for a bearer. The relevant information which is to be transmitted from the UE to the MeNB is basically the same information as in a usual PDCP status report, namely the FMS and (optionally) one or more bitmap octets, referring to a particular data radio bearer (in this case, data radio bearer(s) going via the SeNB). However, the enhanced PDCP status report of the first embodiment shall refer to all data radio bearers which are going via the SeNB1; and even in case there is only one radio bearer (as in the exemplary scenario assumed for FIGS. 25 and 26), the format of the enhanced PDCP status report shall already take this into account. Therefore, in order to distinguish the status report information (FMS, bitmap) from one data radio bearer from the status report information (FMS, bitmap) from the enhanced PDCP status information for another data radio bearer, a radio bearer ID is included for identifying the corresponding radio bearer to which the status report information pertains, and an extension flag is included indicating whether status report information for another data radio bearer follows or not. FIG. 30 exemplarily illustrates the format of such an enhanced PDCP status report of the first embodiment. As can be appreciated, in this example, the RB ID is followed by the data field FMS for the data radio bearer identified by the preceding RB ID field, further followed by one or more corresponding (optional) bitmaps, and finally an extension flag. In case the extension flag indicates the presence of further status report information, the format of RB ID, FMS and optionally bitmap(s) is repeated for as many radio bearers as shall be remapped to a eNB. The order of the field in the enhanced PDCP SR can be different from the ones exemplarily shown in FIGS. 30 and 31.

Please note that currently the radio bearers are identified by 5 bits, thus allowing distinguishing up to 32 different radio bearers. Correspondingly, the RB ID field in the enhanced PDCP status report of the first embodiment may also be 5 bits, but it should be noted that the RB ID field may also be any other number of bits long (e.g. 2, 3, 4, 6, 7, 8, etc.).

As will be explained in the following, there are different possibilities on how to transmit the enhanced PDCP status information of the first embodiment, having influence on the particular steps to be performed by the UE. For illustration purposes this will not be distinguished at this point, but will be explained in detail later. Suffice it that, as just explained, the UE prepares an enhanced PDCP status report upon reception of a corresponding trigger from the MeNB, the enhanced PDCP status report comprising at least status report information for all of the data radio bearers going via SeNB1 (in this example only radio bearer #1) which are going to be remapped to the target eNB (in this example SeNB2) respectively accompanied by a corresponding RB identifier.

The enhanced PDCP status report is then transmitted to the MeNB, either directly to the MeNB (details will be explained later; see e.g. FIG. 26) or via the target SeNB2 (see FIG. 25). In any case, the Macro eNB (with the PDCP layer) will receive the enhanced PDCP status report and can therefrom exactly infer the PDCP SDUs which already could be transmitted successfully to the UE before handover and which not. Based on the received PDCP status report, the MeNB will only forward unacknowledged PDCP SDU/PDUs to the SeNB2, to be further retransmitted to the UE. Correspondingly, the lossless handover procedure of the UE can be made more efficient since only those PDCP SDUs that have indeed been not successfully received by the UE before handover, are actually retransmitted to the UE.

According to a more advantageous implementation of the first embodiment, a further problem is solved as will be explained in the following. Since a PDPC status report for a radio bearer is a PDCP control PDU and hence, from MAC point of view, treated as "normal data" of the radio bearer, the UE would send (according to the prior art) the PDCP status report to SeNB2 (after SeNB change), which in turn would forward the PDCP status report to the MeNB as already explained above. In detail, the logical channel prioritization (LCP) procedure in MAC will ensure that data of radio bearers which are mapped via the SeNB are in uplink only sent to SeNB—i.e. there is no possibility to send data of a radio bearer which is mapped to SeNB directly to MeNB in uplink. This however causes problems due to the possibly long delay of the backhaul (i.e. interface between SeNB and MeNB), lowering the gain of the PDCP status reporting significantly. As explained in the background section, the backhaul between MeNB and SeNB can be slow and one direction latency could be high, e.g. 60 ms. Assuming the 60 ms delay for the backhaul, the PDCP status report would be received somewhere at 80 ms after the SeNB change at the MeNB (where the scheduling delay for transmission from UE to SeNB is considered). It would then take another 60 ms before the PDCP PDUs which need to be transmitted are received at the SeNB.

Therefore, according to this more advantageous implementation of the first embodiment, the enhanced PDCP status report (as explained above) shall be sent directly to the MeNB rather than via the SeNB. This would also have the advantage that the enhanced PDCP status report can be sent before the SeNB change is even finished, since a different radio bearer is used for transport, a radio bearer which is not remapped to another base station and thus can be used even during the SeNB change. This is depicted exemplary in FIG. 26.

This may achieved in several ways: via a signaling radio bearer, via a data radio bearer or via a MAC control element.

In case the enhanced PDCP status report shall be transmitted from the UE via a signaling radio bearer directly to the MeNB, the UE may piggyback same to any RRC message, and transmit same to the MeNB. Correspondingly, for example immediately after the enhanced PDCP status report is finished, the UE (in particular its RRC layer) may prepare an RRC message (preferably short) and append (or otherwise include) the enhanced PDCP status report message to the RRC message, before same is transmitted by the UE to the MeNB in the usual manner via the corresponding SRB.

In another exemplary implementation, the RRC Connection Reconfiguration Complete message can be re-used by the UE to carry the enhanced PDCP status report of the first embodiment. This is depicted in FIG. 29, which discloses part of the handover procedure as exemplary assumed for the following explanation. As can be seen, FIG. 29 is an adapted excerpt of the handover procedure as explained and illustrated in FIG. 15. It is assumed for exemplary purposes only that the handover procedure as will be decided by 3GPP for an SeNB change is similar to the handover procedure as currently defined and explained in connection with FIG. 15. For instance, it is assumed that the mobility control functionality will reside in MeNB, i.e. MeNB decides about mobility events like SeNB change, and will thus send the RRC Connection Reconfiguration message to the UE (which may or may not be used by the UE as trigger for preparing and then transmitting the enhanced PDCP status report). It is further assumed that a Random access procedure will be performed between the UE and the tgt SeNB, although this is still open for discussion in 3GPP. Similarly, it is assumed that the RRC Connection Reconfiguration Complete message is transmitted by the UE to the MeNB, as the other end point of the RRC layer. The same assumptions apply to the scenarios and implementations of FIGS. 27 and 28 too. It should be noted that all of these are mere assumptions and shall not restrict the broader concept of the first embodiment as explained above.

Coming back to FIG. 29, as can be seen therefrom the enhanced PDCP status report is transmitted as part of the RRC Connection Reconfiguration Complete message (step 11) to the MeNB. FIG. 31 depicts the format of the relevant information of the enhanced PDCP SR. This happens however after the data forwarding (step 8) is performed between the MeNB and the target SeNB, such that also PDCP SDU/PDUs may have been forwarded to the target SeNB which, according to the enhanced PDCP status report received later, would not be needed at the UE due to having been received correctly before SeNB change. In order to still be able to avoid that the target SeNB re-transmits these unnecessary PDCP SDU/PDUs to the UE, the MeNB can e.g. forward the PDCP status report to the target SeNB too, such that the target SeNB in turn can infer which of the PDCP PDUs forwarded by the MeNB need not be re-transmitted to the UE after SeNB change.

Figure 13:
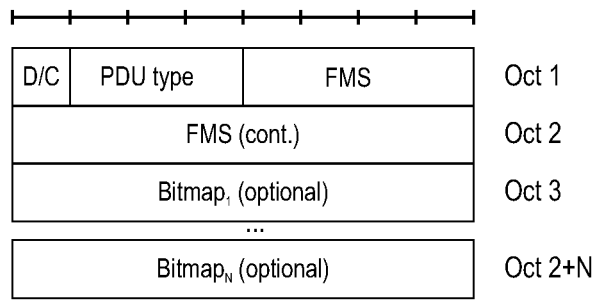
FIGS. 13 and 14 illustrate the format of a PDCP control PDU carrying a PDCP status report, respectively when using a 12-bit and 15-bit sequence number.
Figure 14:
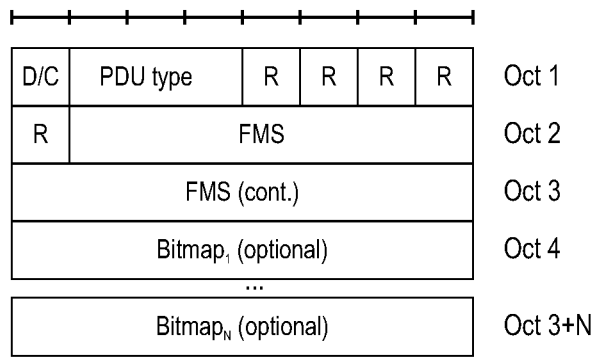

In case the enhanced PDCP status report shall be transmitted from the UE via a data radio bearer directly to the MeNB, this may be done e.g. as a PDCP control PDU; similar to the PDCP control PDU carrying the normal PDCP SR (see FIG. 13, 14). To said end, a third PDCP control PDU type can be introduced with a corresponding new PDU type ID (apart from the two PDCP control PDU types already defined, namely normal PDCP SR and ROHC feedback) which would identify an enhanced PDCP status report as discussed above in connection with the first embodiment as being different from the normal PDCP SR. An example for the format of this third PDCP control PDU type for enhanced PDCP SR is depicted in FIG. 30.

The transmission of the PDCP control PDU carrying the enhanced PDCP SR is illustrated in FIG. 27. As can be seen, the PDCP control PDU with the enhanced PDCP SR can be transmitted before the data forwarding by the MeNB is performed in step 8, such that the MeNB may already consider the information in the enhanced PDCP SR on already correctly received PDCP SDU/PDUs and may thus avoid forwarding these to the target SeNB. Thus, the re-transmission of unnecessary data is avoided between the MeNB and target SeNB and on the air interface between the target SeNB and the UE.

In case the enhanced PDCP status report shall be transmitted from the UE as a MAC control element, the PDCP entities in the UE for which status information should be transmitted, need to inform the MAC layer about the status information. This inter-layer communication may be done by primitives. The MAC layer will then generate a corresponding MAC control element with said enhanced PDCP status information and will transmit the MAC CE directly to the MeNB. The MeNB receives the MAC CE and forwards the information of the enhanced PDCP SR in the MAC CE to its PDCP layer for further processing. The content of the MAC CE is depicted in FIG. 31 and is basically identical to the case where the enhanced PDCP SR is piggybacked with an RRC message.

The transmission of the MAC CE in the context of the handover procedure is exemplary illustrated in FIG. 28. As already explained before in connection with FIG. 27, the MAC CE with the enhanced PDCP SR can be transmitted immediately upon compiling it, and thus can be received by the MeNB before it performs the data forwarding of step 8. Thus again, the MeNB may already consider the information in the enhanced PDCP SR on already correctly received PDCP SDU/PDUs and may thus avoid forwarding these to the target SeNB. Thus, the re-transmission of unnecessary data is avoided between the MeNB and target SeNB and on the air interface between the target SeNB and the UE.

Second Embodiment

According to a second embodiment of the invention, the problem of the backhaul delay incurred by PDCP status reports can also be solved differently as will be explained in the following.

As described above, the delay problem for PDCP status reporting at mobility event (such as SeNB change from source SeNB to target SeNB) stems from the fact that PDCP status reports are, according to current LTE specifications, transmitted via the radio bearer the PDCP status information pertains to. For the case of SeNB, it means that a PDCP status report will be, after SeNB change has taken place, sent to the target SeNB which then in turn forwards the received PDCP status report to the MeNB (since PDCP layer is residing in MeNB).

In order to reduce the delay for PDCP status reporting at mobility events such as SeNB change, radio bearers which are configured between SeNB and UE and hence are reconfigured during SeNB change are, according to some exemplary implementation of this embodiment, temporarily configured between MeNB and UE during the SeNB change procedure. In other words, for a transient time period the radio bearers configured between source SeNB and UE are, upon reception of RRCConnectionReconfiguration message (SeNB), first remapped to MeNB (i.e. configured between MeNB and UE) for a limited time period, before then ultimately being configured between target SeNB and UE. During this transient time period where the radio bearers are mapped to the MeNB temporarily, the UE sends PDCP status report information for the corresponding radio bearers directly to the MeNB. The PDCP status reports can be sent as PDCP control PDUs on the respective radio bearers, which are temporarily mapped to MeNB. According to this second embodiment, the delay incurred by PDCP status reporting could be greatly reduced. In particular, since PDCP status information may already be considered by MeNB, forwarding of unnecessary PDCP PDUs to target SeNB can be avoided.

Third Embodiment

According to a third embodiment of the invention, PDCP status reporting for the user plane architectures where EPS bearers are split between MeNB and SeNB like shown in FIG. 22h, 22i is described. Since packets of EPS bearer #2 (in FIG. 22h, 22i) can be transmitted directly via MeNB and also via SeNB, the UE behavior for control information reporting in the uplink like PDCP status reporting shall be according to this embodiment, that control information shall be reported directly to the MeNB. According to some exemplary implementation of this embodiment logical channel prioritization procedure in MAC shall schedule the transmission of a PDCP status report directly to the MeNB. This achieves that PDCP control information is received at MeNB without the backhaul delay introduced by the detour via the SeNB. Similarly to PDCP status information, also other radio bearer specific control information like RLC status report shall be transmitted, i.e. this is taken care of by LCP procedure, directly to the MeNB.

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for transmitting a status report by a mobile station, wherein the mobile station is connected via at least one radio bearer to a master base station and via at least one data radio bearer to a source secondary base station, the method comprising the steps of:
   generating, by the mobile station, the status report when reconfiguring the at least one data radio bearer of the mobile station from the source secondary base station to a target base station, the status report including:
   information on a reception status of data packets received by the mobile station via all of the at least one data radio bearer connecting the mobile station to the source secondary base station; and
   one radio bearer identifier for each of the at least one data radio bearer whose information is included in the status report; and
   transmitting, by the mobile station, the status report to the master base station, the status report being transmitted via a temporary radio bearer, the temporary radio bearer being one of the at least one radio bearer connecting the mobile station to the source secondary base station.

2. The method according to claim 1, wherein the status report is transmitted by the mobile station to the master base station as part of a Radio Resource Control, RRC, message.

3. The method according to claim 1, wherein the status report is transmitted by the mobile station to the master base station as a Packet Data Convergence Protocol, PDCP, control packet data unit.

4. The method according to claim 1, wherein the status report is transmitted in an Media Access Control, MAC, control element.

5. The method according to claim 1, wherein the target base station is either: the master base station to which the mobile station is connected, or another master base station, or a target secondary base station.

6. The method according to claim 1, wherein the status report further comprises at least one extension flag after the information on the reception status of data packets received via one of the at least one data radio bearer connecting the mobile station to the source secondary base station, wherein the extension flag indicates the presence of further information on the reception status of data packets received via another one of the at least one data radio bearer.

7. The method according to claim 1, wherein the status report is a PDCP status report, comprising information on a reception status of PDCP service data units received via all of the at least one data radio bearer connecting the mobile station to the source secondary base station.

8. The method according to claim 1, wherein the status report is transmitted in response to a reception of an RRC connection reconfiguration message in the mobile station, the RRC connection reconfiguration message being received as part of the reconfiguring of the at least one data radio bearer of the mobile station from the source secondary base station to the target base station.

9. The method according to claim 1, wherein the status report is a PDCP control packet data unit, PDU, comprising:
   a D/C field of 1 bit length to identify the PDCP control PDU as a control or data PDU,
   a type field of 3 bit length to identify a type of the PDCP control PDU,
   a radio bearer identifier field to identify a first radio bearer of the at least one radio bearer whose information is included in the status report,
   a field of 12 or 15 bit length to identify a PDCP sequence number of a first missing PDCP service data unit, SDU, regarding the first radio bearer,
   an extension flag field of 1 bit length to indicate whether further information is comprised in the PDCP control PDU or not,
   and in case the extension flag field indicates that further information is comprised in the PDCP control PDU, the status report comprises:
   another radio bearer identifier field to identify a second radio bearer of the at least one radio bearer whose information is included in the status report,
   another field of 12 or 15 bit length to identify a PDCP sequence number of a first missing PDCP service data unit, SDU, regarding the second radio bearer,
   another extension flag field of 1 bit length to indicate whether further information is comprised in the PDCP control PDU or not.

10. The method according to claim 1, wherein the data packets are forwarded from the master base station via the source secondary base station to the mobile station, and wherein a higher layer with the status report function is located at the master base station but not at the source secondary base station.

11. A mobile station for transmitting a status report, wherein the mobile station is connected via at least one radio bearer to a master base station and via at least one data radio bearer to a source secondary base station, the mobile station comprising:
   a processor which, in operation, generates the status report when the at least one data radio bearer of the mobile station is reconfigured from the source secondary base station to a target base station, the status report including:
   information on a reception status of data packets received by the mobile station via all of the at least one data radio bearer connecting the mobile station to the source secondary base station; and
   one radio bearer identifier for each of the at least one data radio bearer whose information is included in the status report; and
   a transmitter which, in operation, transmits the status report to the master base station, the status report being transmitted via a temporary radio bearer, the temporary radio bearer being one of the at least one radio bearer connecting the mobile station to the source secondary base station.

12. The mobile station according to claim 11, wherein the transmitter, in operation, transmits the status report to the master base station:

as part of a Radio Resource Control, RRC, message, or
as a Packet Data Convergence Protocol, PDCP, control packet data unit, or
in an Media Access Control, MAC, control element.

13. The mobile station according to claim 12, wherein the status report further comprises at least one extension flag after the information on the reception status of data packets received via one of the at least one data radio bearer connecting the mobile station to the source secondary base station, wherein the extension flag indicates the presence of further information on the reception status of data packets received via another one of the at least one data radio bearer.

14. The mobile station according to claim 11, wherein the status report is a PDCP status report, comprising information on a reception status of PDCP service data units, received by a receiver of the mobile station via all of the at least one data radio bearer connecting the mobile station to the source secondary base station.

15. The mobile station according to claim 11, wherein the status report is transmitted in response to a reception of an RRC connection reconfiguration message by a receiver in the mobile station, the RRC connection reconfiguration message being received as part of the reconfiguring of the at least one data radio bearer of the mobile station from the source secondary base station to the target base station.

16. The mobile station according to claim 11, wherein the status report is a PDCP control packet data unit, PDU, comprising:
   a D/C field of 1 bit length to identify the PDCP control PDU as a control or data PDU,
   a type field of 3 bit length to identify a type of the PDCP control PDU,
   a radio bearer identifier field to identify a first radio bearer of the at least one radio bearer whose information is included in the status report,
   a field of 12 or 15 bit length to identify a PDCP sequence number of a first missing PDCP service data unit, SDU, regarding the first radio bearer,
   an extension flag field of 1 bit length to indicate whether further information is comprised in the PDCP control PDU or not,
   and in case the extension flag field indicates that further information is comprised in the PDCP control PDU, the status report comprises:
   another radio bearer identifier field to identify a second radio bearer of the at least one radio bearer whose information is included in the status report,
   another field of 12 or 15 bit length to identify a PDCP sequence number of a first missing PDCP service data unit, SDU, regarding the second radio bearer,
   another extension flag field of 1 bit length to indicate whether further information is comprised in the PDCP control PDU or not.

17. The mobile station according to claim 11, further comprising:
   a receiver which, in operation, receives a status report from the master base station, the status report from the master base station including:
      information on a reception status of data packets received by the master base station via all of the at least one data radio bearer connecting the master base station to the source secondary base station; and
      one radio bearer identifier for each of the at least one data radio bearer which information is comprised in the status report from the master base station.

18. A master base station for processing a status report transmitted from a mobile station, wherein the mobile station is connected via at least one radio bearer to the master base station and via at least one data radio bearer to a source secondary base station, the base station comprising:
   a receiver which, in operation, receives a status report from the mobile station via a temporary radio bearer, when reconfiguring the at least one data radio bearer of the mobile station from the source secondary base station to a target base station, the temporary radio bearer being one of the at least one radio bearer connecting the mobile station to the source secondary base station, the status report including:
   information on a reception status of data packets received by the mobile station via all of the at least one data radio bearer connecting the mobile station to the source secondary base station; and
   one radio bearer identifier for each of the at least one data radio bearer whose information is comprised in the status report.

* * * * *